US012641335B1

(12) United States Patent
Berezhanskyi et al.

(10) Patent No.: US 12,641,335 B1
(45) Date of Patent: May 26, 2026

(54) WAKEUP SENSOR THRESHOLD AUTOCALIBRATION

(71) Applicant: Amazon Technologies, Inc., Seattle, WA (US)

(72) Inventors: Yevhen Berezhanskyi, Amsterdam (NL); Yan Li, Delft (NL); Mariia Olegivna Halushko, Amsterdam (NL); Oleksandr Lazariev, Hoofddorp (NL); Dmytro Likhomanov, Amsterdam (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 62 days.

(21) Appl. No.: 18/900,044

(22) Filed: Sep. 27, 2024

(51) Int. Cl.
  *H04N 23/65* (2023.01)
  *G06F 1/3231* (2019.01)
  *G06V 20/40* (2022.01)
  *H04N 23/61* (2023.01)

(52) U.S. Cl.
  CPC ......... *H04N 23/651* (2023.01); *G06F 1/3231* (2013.01); *G06V 20/41* (2022.01); *H04N 23/61* (2023.01)

(58) Field of Classification Search
  CPC .... H04N 23/651; H04N 23/61; G06F 1/3231; G06V 20/41
  USPC ........................................................ 348/372
  See application file for complete search history.

(56) References Cited

U.S. PATENT DOCUMENTS

| | | | | |
|---|---|---|---|---|
| 9,710,716 | B2* | 7/2017 | Case ...................... | G06V 40/16 |
| 10,937,169 | B2* | 3/2021 | Dharur ..................... | G06T 7/11 |
| 2011/0069175 | A1* | 3/2011 | Mistretta .................. | G06T 5/20 |
| | | | | 348/E5.09 |
| 2011/0298923 | A1* | 12/2011 | Mukae ................... | G08G 1/205 |
| | | | | 348/E7.085 |
| 2012/0013786 | A1* | 1/2012 | Yasuda ................ | H04N 23/635 |
| | | | | 348/349 |
| 2016/0327643 | A1* | 11/2016 | Schwager .............. | G03B 13/20 |
| 2021/0358293 | A1* | 11/2021 | Tournier ................. | G01P 13/00 |
| 2022/0207925 | A1* | 6/2022 | Kim ....................... | G07C 5/006 |
| 2023/0388632 | A1* | 11/2023 | Ding .................. | G02B 27/0093 |
| 2024/0420289 | A1* | 12/2024 | Cho .......................... | G06T 5/70 |

* cited by examiner

*Primary Examiner* — Usman A Khan
(74) *Attorney, Agent, or Firm* — K&L Gates LLP

(57) ABSTRACT

Systems and methods are described for wakeup sensor threshold autocalibration. An example method includes generating sensor data by a wakeup sensor. The example method also includes determining that the sensor data represents a potential motion event based on a comparison of the sensor data with a sensor threshold value. The example method also includes controlling a camera device to capture video data and generating, by an onboard motion verification model and based on the video data, motion verification data labeling the potential motion event as a true positive motion event. The example method also includes determining an updated sensor threshold value by modifying the sensor threshold value by a first amount, where the first amount is determined based on the first motion verification data.

20 Claims, 8 Drawing Sheets

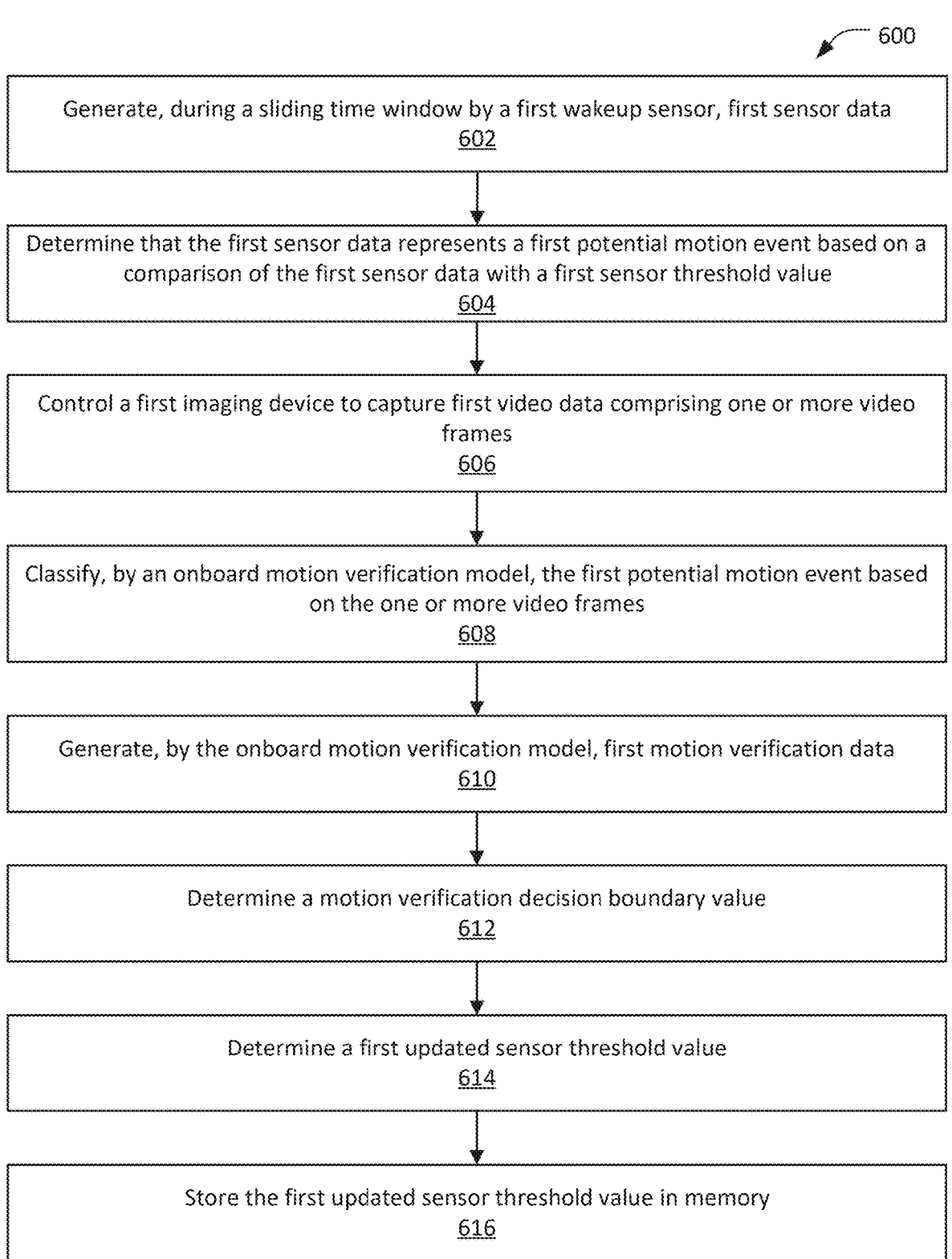

600

Generate, during a sliding time window by a first wakeup sensor, first sensor data
602

Determine that the first sensor data represents a first potential motion event based on a comparison of the first sensor data with a first sensor threshold value
604

Control a first imaging device to capture first video data comprising one or more video frames
606

Classify, by an onboard motion verification model, the first potential motion event based on the one or more video frames
608

Generate, by the onboard motion verification model, first motion verification data
610

Determine a motion verification decision boundary value
612

Determine a first updated sensor threshold value
614

Store the first updated sensor threshold value in memory
616

FIG. 6

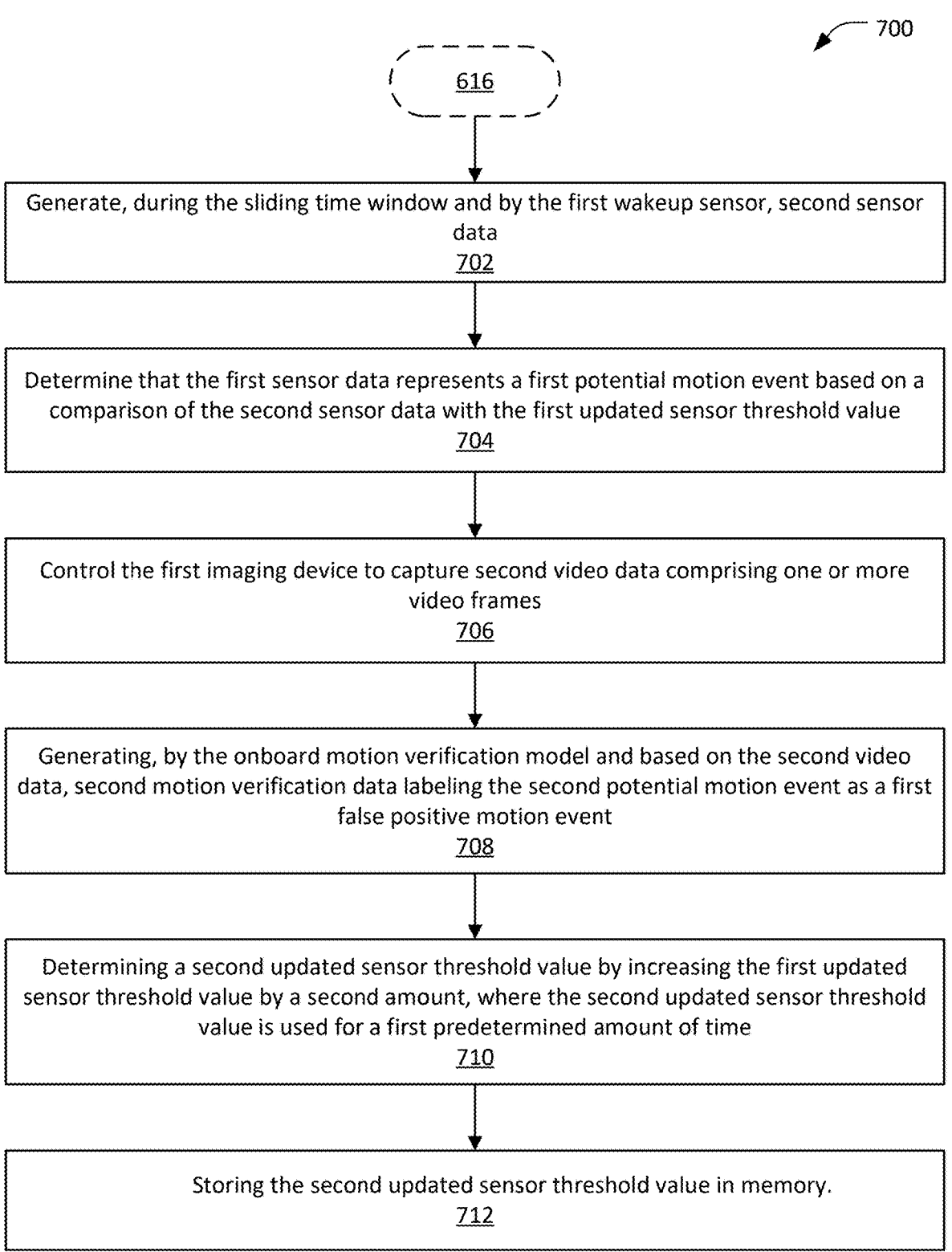

700

616

Generate, during the sliding time window and by the first wakeup sensor, second sensor data
702

Determine that the first sensor data represents a first potential motion event based on a comparison of the second sensor data with the first updated sensor threshold value
704

Control the first imaging device to capture second video data comprising one or more video frames
706

Generating, by the onboard motion verification model and based on the second video data, second motion verification data labeling the second potential motion event as a first false positive motion event
708

Determining a second updated sensor threshold value by increasing the first updated sensor threshold value by a second amount, where the second updated sensor threshold value is used for a first predetermined amount of time
710

Storing the second updated sensor threshold value in memory.
712

FIG. 7

WAKEUP SENSOR THRESHOLD AUTOCALIBRATION

BACKGROUND

Wakeup sensors are utilized in a wide variety of applications and in many types of electronic devices. For example, security camera systems sometimes use wakeup sensors to initiate video capture and/or video streaming to one or more other computing devices.

BRIEF DESCRIPTION OF DRAWINGS

Reference will now be made to the accompanying drawings, which are not necessarily drawn to scale. Some examples may include fewer or more components than those shown in the figures.

FIG. 6 illustrates a flowchart diagram of an example process related to STA in accordance with various aspects of the present disclosure.

FIG. 7 illustrates a flowchart diagram of an example process related to a higher-threshold period instantiated by an STA onboard system in accordance with various aspects of the present disclosure.

DETAILED DESCRIPTION

Figure 1:
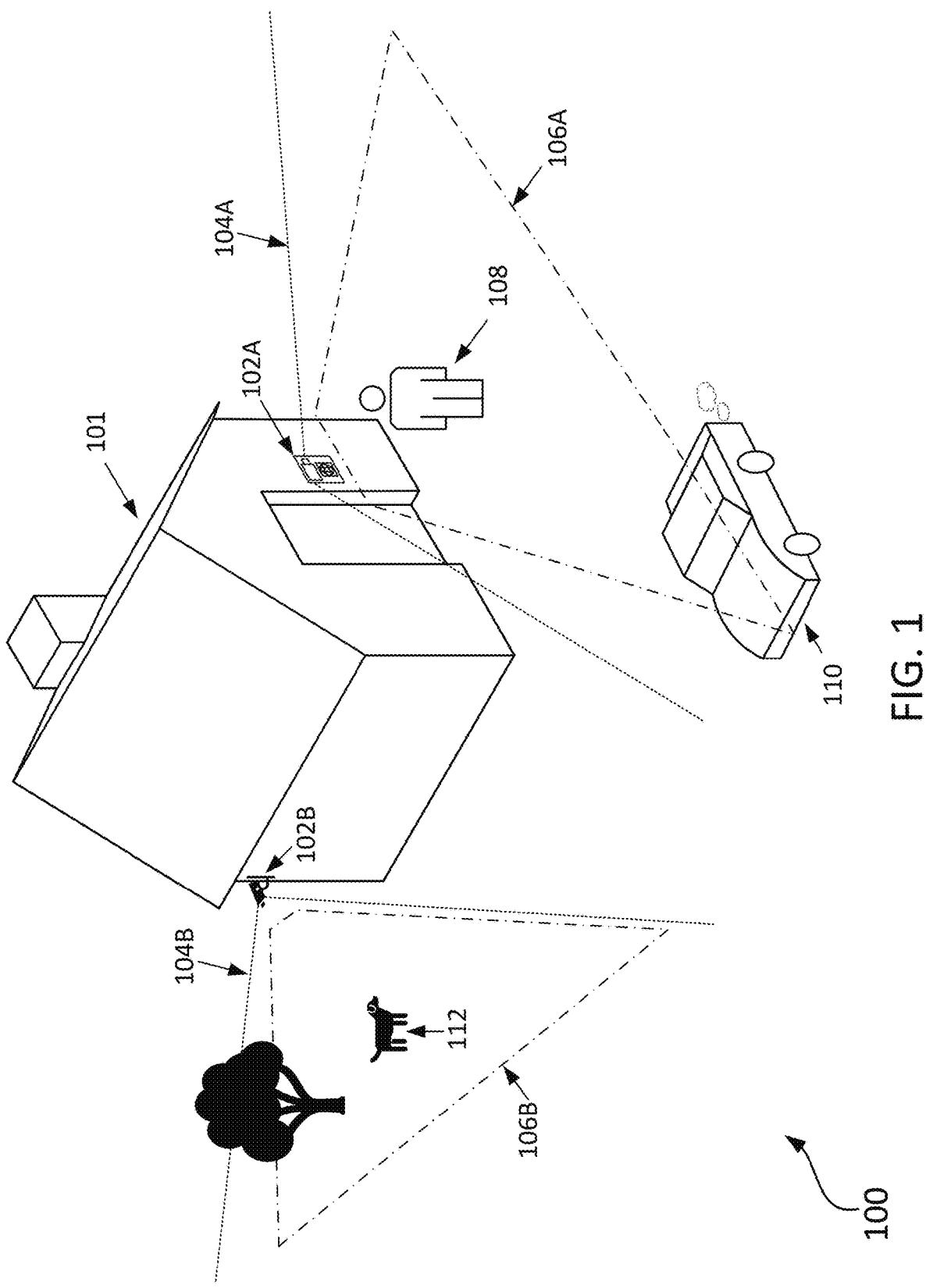
FIG. 1 illustrates an example environment comprising example electronic devices associated with respective sensor threshold autocalibration (STA) onboard systems in accordance with various aspects of the present disclosure.

In the following description, reference is made to the accompanying drawings which illustrate several embodiments of the present invention. It is understood that other embodiments may be utilized, and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In various examples, a location such as an office building, home, outdoor space, and/or any other physical location or combination of physical locations may be monitored by one or more camera devices of a security system or other type of camera system (e.g., a smart doorbell with an integrated camera). In various examples, camera devices may be battery-powered for ease of installation and to avoid unsightly power cords. In various other examples, camera devices may be powered through a wired interface (e.g., through "mains" power from a wall socket). In at least some examples, camera devices may include wakeup sensors to detect motion. In some examples, camera devices may be operated in a low power state (sometimes referred to as "sleep" or standby mode) prior to detection of motion. In some examples, during the low power state, the camera may capture and store a limited amount of video in a rolling buffer—with the oldest portions of the video in the rolling buffer being deleted as video from the current time is stored. When motion is detected the camera device may begin encoding and/or streaming video to one or more other devices (e.g., a video processing device) for storage, display, and/or processing. For example, the contents of the rolling buffer may be encoded and sent to another device followed by a stream of video captured by the camera while motion is detected. Advantageously, waiting until motion is detected prior to capturing and/or streaming image data and/or video data may prolong battery life (and minimize power consumption) by capturing, encoding, and/or streaming video only when movement is detected. In many cases, and particularly in a surveillance context, video segments that do not depict movement and/or which represent trivial movement (e.g., leaves blowing in the wind) may not be of sufficient interest to a user of the camera system to warrant continuous video capture and/or streaming, particularly given that transmission of video data results in a quicker consumption of battery power and more frequent battery replacement. In various examples, video data may refer to one or more sequential frames of image data.

In some examples, insignificant motion (e.g., the motion of an animal or passing vehicle) may trigger a wakeup sensor of a camera device, which may, in turn, cause the camera device to begin capturing and/or streaming video even though the video may not be of interest to a user. Accordingly, it may be beneficial to limit the number of such "false wakeups" or "false positives" where insignificant motion results in video capture and/or streaming, which, in turn, may lead to increased power consumption and depletion of battery power. For example, an outdoor camera device may include a wakeup sensor with a "field-of-view" (e.g., the area monitored by the wakeup sensor) that includes a tree outside of a user's home. In the example, the wakeup sensor may be triggered each time that the wind blows and the leaves of the tree are rustled. The triggering of the wakeup sensor may, in turn, cause the camera device to capture and/or stream video. In another example, a wakeup sensor may be triggered each time a pet or wild animal moves within the field-of-view (FOV) of the wakeup sensor. In another example, a wakeup sensor may be triggered by cloud movement and sunlight changes due to passing clouds. In yet another example, the ambient temperature of an outside environment due to the changing of the season may lead to interference or conditions that may trigger or interfere with certain types of wakeup sensors, which may in turn lead to a false wakeup. Various systems and techniques described herein may be effective to prevent triggering of video capture and/or streaming due to inconsequential motion that is not likely to be of interest to a user.

In various examples, electronic devices such as smart doorbells (e.g., network-enabled doorbells with integrated cameras) or camera devices may include and/or be configured in communication with one or more wakeup sensors such as passive infrared (PIR) sensors that are effective to detect motion in an environment monitored by the PIR sensor and/or by the electronic devices. PIR sensors detect infrared (IR) radiation emitted by objects within the PIR sensors' fields-of-view. In various examples, a PIR sensor may be effective to determine when an object passes through a PIR sensor's FOV by determining differential changes in the IR detected by the PIR sensor. PIR sensors often include two sensor "halves" (e.g., a pair comprising a positive detector element and a negative detector element). In some cases, PIR sensors may include multiple pairs of detector elements (e.g., multi-channel PIR sensors). A multi-facet lens breaks light received from a scene into multiple regions and projects these regions on to the different detector elements of the sensor. The sensor integrates the black body radiation detected in the two detector elements (or in multiple pairs of detector elements, depending on the sensor) and determines the differential change. The differential change is the difference in detected radiation between the two sensor detector elements. If the differential changes caused by an IR-radiating object entering the FOV associated with a positive detector element (resulting in a positive differential change in detected IR) and/or leaving the FOV of the positive detector element (resulting in a negative differential change in detected IR) of the PIR sensor are above a threshold value (typically a tunable threshold referred to as the "sensitivity level" of the PIR sensor), the PIR sensor may output a signal indicating that motion has been detected. PIR sensors may be passive in the sense that they may not include any IR light source and may detect radiation emitted from objects within the sensor's FOV without subjecting such objects to IR light projected by a light source of the sensor. Accordingly, PIR sensors consume relatively little power when in use.

The detector elements of a PIR sensor may comprise, for example, two pyroelectric sensing elements. Each pyroelectric sensing element comprises a pyroelectric crystal. Each pyroelectric sensing element generates an electrical charge in response to heat. Radiation (e.g., infrared light) received at a surface of a pyroelectric sensing element generates heat, which in turn generates an electrical charge. Put another way, an absorbing layer of a pyroelectric sensing element transforms radiation flux change into a change in temperature and a pyroelectric component performs a thermal to electrical conversion. One or more low-noise and low leakage current field-effect transistors (e.g., JFET) or operational amplifiers are used to convert charge into a signal voltage.

As discussed above, a PIR sensor may comprise two pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on the polarity of the pyroelectric sensing element that experienced the change in temperature).

A PIR sensor may include two slots, each providing an optical path to one of the pyroelectric sensing elements. A passive infrared sensor may comprise one or more lenses configured to direct light received at the one or more lenses onto one of the pyroelectric sensing elements. A passive infrared sensor may include one or more lenses configured to direct light received at a first portion of the one or more lenses (e.g. a left portion) onto a first of the pyroelectric sensing elements (e.g. a left sensing element), and to direct light received at a second portion of the one or more lenses (e.g. a right portion) onto a second of the pyroelectric sensing elements (e.g. a right sensing element). The one or more lenses may comprise one or more Fresnel lenses having one or more features configured to direct light. The pyroelectric elements may be positioned side by side and aligned along an axis (e.g., a horizontal axis or a vertical axis).

A passive infrared sensor may be analog, with an analog signal output, or may be digital, with digital data output generated utilizing an analog-to-digital converter (ADC) (e.g., output from the ADC or output generated based on output from the ADC).

An electronic device (e.g., a smart doorbell or security camera) may include one or more passive infrared sensors that the electronic device uses to detect motion of objects. Each passive infrared sensor may output a signal or sensor data, where the electronic device uses a characteristic determined using the signal or sensor data to determine whether the passive infrared sensor detected an object within an area-of-interest (e.g., a user-defined area defined by or located within the boundaries of an FOV of a wakeup sensor (e.g., a PIR sensor)). The characteristic may include a voltage represented by the signal or sensor data, an amplitude of a wave generated or determined using the signal or sensor data, an angle of the wave generated using the signal or sensor data, and/or the like.

For example, a first PIR sensor may have a first FOV that extends a first distance from the electronic device. In some examples, the first FOV is created based on placing the first passive infrared sensor in a first direction and/or using one or more lenses (which may be a lens of the PIR sensor, or which may be used in addition to or in replacement of a lens of the PIR sensor).

In accordance with one or more examples, a wakeup sensor configured as a PIR sensor includes an integrated circuit (IC) component that receives voltage inputs from one or more lines coupled to a first PIR sensing element and a second PIR sensing element. In accordance with one or more examples, the IC component receives an input from each sensing element, while in accordance with one or more other examples, the IC component receives a summed voltage.

In accordance with one or more preferred implementations, the IC component determines whether a summed voltage exceeds a first sensor threshold value, and, if so, sends a logic signal (e.g., a Boolean value or an interrupt signal) to a controller (e.g., a microcontroller unit or MCU, such as a polling component) of an electronic device. Based on the received logic signal, the controller begins periodically polling or requesting sensor data (e.g., a most recent data value at the time of polling) from the IC component. For example, the controller may poll the IC component at a rate of 64 Hz. In accordance with one or more preferred implementations, the logic signal represents an interrupt that triggers additional processing based on sensor data and/or image data as described herein.

In some example systems, if motion is detected in an environment monitored by a wakeup sensor such as a PIR sensor, the triggered wakeup sensor may send a signal to one or more camera devices associated with the example system. The signal may be effective to cause the camera device(s) to begin capturing image data and/or video data. For example, a wakeup sensor (e.g., a PIR sensor) and a camera device may be situated on an exterior wall of a building. If the wakeup sensor (e.g., a PIR sensor) is triggered (e.g., due to a human walking towards the building), the wakeup sensor may send a signal to the camera device indicating that motion has been detected by the wakeup sensor. In response to receipt of the signal from the wakeup sensor, the camera device may be configured to begin capturing video.

However, the triggering of a wakeup sensor (e.g., a PIR sensor detecting a motion event) may rely on tunable threshold values (e.g., a threshold magnitude of differential change between the halves of a PIR sensor). If such thresholds are set too high, motion events of interest may be missed without the camera device being triggered. Conversely, if such thresholds are set too low, insignificant motion events (e.g., leaves blowing in the wind, raindrops, etc.) may cause the camera device to be triggered, resulting in the camera device capturing video of events that are unlikely to be of interest to the user and potentially causing information fatigue (where the user is unlikely to pay attention to video feeds from a camera due to a large number of false positives). This may be a problem especially when an electronic device such as a smart doorbell is oriented towards a busy street such that a FOV associated with a corresponding wakeup sensor is likely to detect passing cars, cyclists, pedestrians, and/or various activity on the street.

Additionally, some wakeup sensors (e.g., PIR sensors) may have difficulties distinguishing between motion that is likely to be of interest to a user and motion that is relatively inconsequential and unlikely to be of interest to a user. For example, an outdoor PIR sensor may trigger based on sunlight that is filtered through a tree as the wind blows the leaves of the tree and different amounts of radiation are detected by different regions and/or halves of the PIR sensor. Additionally, in scenarios where the target objects to be detected are people at relatively short distances (e.g., a PIR-based wakeup sensor in a video-enabled doorbell camera), large, non-target objects at greater distances, like cars passing on a street, can cause false triggering of the wakeup sensor leading to false wakeups of various electronic components and battery drain. Additionally, some wakeup sensors (e.g., PIR sensors) often have difficulty detecting motion when the motion is directly toward or away from the wakeup sensor, as the radiation from such objects may not pass between different sensor halves and/or sensor regions and thus may not trigger the wakeup sensor or may trigger the wakeup sensor too late (known as a "late wakeup"). To account for this difficulty, the sensitivity of the wakeup sensor may be increased such that sensor threshold value is decreased, which in turn, may lead to increased false triggering due to distant non-target motion and/or increased wakeup sensor interference.

Additionally, in systems that include advanced processing such as various machine learning (ML) techniques (e.g., computer-vision, object classification), false wakeups and/or false positive classifications (e.g., ML classifications identifying insignificant motion and/or nuisance objects such as animals or vehicles) lead to excess computer resource consumption in addition to excess energy consumption (battery consumption, mains power consumption). As described herein, conventional electronic devices and/or motion detection systems place various components into a sleep or standby mode until such a time as they are needed (e.g., to classify a potential motion event). Such conventional devices and systems may utilize fixed, or "baseline," sensor threshold values used to determine whether sensor data (e.g., PIR sample magnitude) indicates that one or more components should be woken up to determine and/or classify the source of potential motion in a particular environment.

In some examples, a particular electronic device may have a set predetermined sensitivity levels (e.g., ten selectable sensitivity levels), where each predetermined sensitivity level is associated with a specific, fixed sensor threshold value. In such examples, a highest sensitivity level may be associated with a lowest sensor threshold value and may lead to the generation of excess motion verifications. As described herein, a mismatch between fixed sensor thresholds and varying sensor noise levels (e.g., PIR noise caused by sunlight) may lead to sub-optimal device performance. If sensor threshold values are too high, valid motion events (which may be of interested to a user) may be missed. If sensor threshold values are too low, the corresponding wakeup sensor will trigger many false wakeups, leading to unnecessary motion event classifications and/or excessive power consumption (e.g., battery consumption).

To address these and other problems, systems and techniques are described herein that provide sensor threshold autocalibration (STA) for electronic devices comprising wakeup sensors. Described herein is an STA onboard system that may be deployed on a network-enabled electronic device (e.g., an "edge" device) such as a smart doorbell, security camera, smart home device, digital assistant, and/or the like. The STA onboard system leverages feedback from a computer-vision (CV)-based onboard motion verification model to dynamically adjust sensor threshold values associated with a respective wakeup sensor (e.g., a PIR sensor) of a corresponding electronic device. As such, the STA onboard system may temporarily raise or lower the sensor threshold values in order to mitigate the aforementioned technological problems of excessive false wakeups, late wakeups, interference, sensor noise, environmental noise, and/or the like that may lead to excessive consumption of power (e.g., battery power) and computational resources associated with a respective electronic device.

In various examples described herein, the sensor data of a wakeup sensor (e.g., a PIR sensor) as well as image data (e.g., video data) associated with a particular environment are input into the CV-based motion verification model (e.g., a supervised ML model, unsupervised ML model, etc.) and may be used to determine whether target motion associated with an object-of-interest is detected in a monitored environment. The motion verification model may be trained using annotated training data that provides examples of positive motion events and negative motion events (together with the attending sensor data). Accordingly, the motion verification model may learn common false positive events and true positive events and may thereby provide more accurate and useful motion detection and/or classification.

ML techniques, such as those described herein, are often used to form predictions, solve problems, recognize objects in image data for classification, and/or the like. In various examples, ML models may perform better than rule-based systems and may be more adaptable as ML models may be improved over time by retraining the models as more data becomes available. Accordingly, ML techniques are often adaptive to changing conditions. Deep learning algorithms, such as neural networks, are often used to detect patterns in data and/or perform tasks.

Generally, in ML models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, and/or the like). The result determines the activation of a neuron in a subsequent layer. In addition, a bias value can be used to shift the output of the activation function to the left or right on the x-axis and thus may bias a neuron toward activation.

Generally, in ML models, such as neural networks, after initialization, annotated training data may be used to generate a cost or "loss" function that describes the difference between expected output of the ML model and actual output. The parameters (e.g., weights and/or biases) of the ML model may be updated to minimize (or maximize) the cost.

For example, the ML model may use a gradient descent (or ascent) algorithm to incrementally adjust the weights to cause the most rapid decrease (or increase) to the output of the loss function. The method of updating the parameters of the ML model is often referred to as back propagation.

It should be noted that the systems and techniques described herein are wakeup sensor agnostic. As described herein, in some examples, a wakeup sensor may be any suitable sensor known in the art capable of detecting motion, movement, vibration, rotation, speed, presence, and/or the like of an object within a given environment and/or with respect to an object itself (e.g., a portable electronic device) comprising such a wakeup sensor. A wakeup sensor may be a sensor configured to transmit one or more signals to one and/or more devices or systems upon the detection of a potential motion, where the one or more signals are configured to "wake up" (e.g., activate, initiate) the one or more devices and/or systems from a standby or "sleeping" state. For example, as described herein, a wakeup sensor may detect a potential motion within a given environment and send one or more signals to a camera device and/or an affiliated system (e.g., a computer vision-based motion classification system) in order to initiate the capture and/or classification of video data related to the potential motion.

As such, while many use cases and examples may be provided herein with reference to motion sensors such as PIR sensors, various other types of wakeup sensors that may utilize a range of sensor threshold values may be employed in the systems and techniques described herein. For example, "disturbance detection" sensors such as an accelerometer-based wakeup sensor may be used. An accelerometer is a device that measures the proper acceleration (a rate of change in velocity) of an object and may be employed to detect, among other things, the speed, vibration, motion, and/or orientation of an object (e.g., an electronic device, a vehicle).

For example, a multi-axis accelerometer may output sensor data comprising a vector quantity indicating a detected magnitude and direction of the proper acceleration of an object (e.g., an electronic device in a vehicle security system). In some examples, such sensor data (e.g., sensor data related to a potential motion event) may be compared to a sensor threshold value in order to determine whether to transmit an interrupt signal and/or to initiate the subsequent activation of various system components (e.g., image capturing devices, computer-vision models, and/or corresponding processing circuitry). As such, a sensor threshold value for a wakeup sensor such as an accelerometer-based wakeup sensor may be automatically calibrated according to the methods described herein.

FIG. 1 illustrates an example environment 100 comprising example electronic devices associated with respective STA onboard systems in accordance with various aspects of the present disclosure. As shown, an electronic device 102A (e.g., a smart doorbell) and an electronic device 102B (e.g., a security camera) may be attached to the exterior of a residential building 101. The respective electronic devices 102A and 102B may be configured to detect motion and/or capture image data with respect to various locations around the residential building 101. FIG. 1 depicts various examples of objects that may be detected or filmed by the respective electronic devices 102A and 102B including a human 108, a vehicle 110, and an animal 112. As shown, the electronic device 102A (e.g., a smart doorbell) is attached to the front of the residential building 101 such that the electronic device 102A is oriented towards a street. The electronic device 102B (e.g., a security camera) is attached to the back of the residential building 101 such that the electronic device 102B is oriented towards the back of the residential building 101 (e.g., a back yard or alley).

In some examples, an electronic device (e.g., electronic device 102A) may comprise a wakeup sensor (e.g., a PIR sensor) and a camera device (e.g., a video camera) associated with an FOV (e.g., FOV 104A), where the FOV is the same or similar for both the wakeup sensor and the camera device. In other examples, an electronic device (e.g., electronic device 102A) may comprise a wakeup sensor (e.g., a PIR sensor) and a camera device (e.g., a video camera) associated with an FOV (e.g., FOV 104A), where the FOV is different for the wakeup sensor and the camera device (e.g., the FOV for the wakeup sensor is wider and/or larger than the FOV of the camera device). In some examples, the electronic device (e.g., electronic device 102A) may be configured to detect motion and/or capture image data within the entire boundaries of the FOV (e.g., FOV 104A). Additionally or alternatively, in some examples, the electronic device (e.g., electronic device 102A) may be configured to detect motion and/or capture image data within the boundaries of an area-of-interest (e.g., area-of-interest 106A). In some such examples, an area-of-interest (e.g., area-of-interest 106A) may be user-defined and/or unique to the environment (e.g., environment 100) in which a respective electronic device (e.g., electronic device 102A) is located. For example, a user may wish to define an area-of-interest (e.g., area-of-interest 106A) that covers only the immediate area in front of a residence (e.g., residential building 101) such as a front porch and/or front sidewalk. In such examples, the electronic device (e.g., electronic device 102A) may be configured to ignore any potential motion events (e.g., passing cars, pedestrian activity) that occur outside of the boundaries of the area-of-interest (e.g., area-of-interest 106A) even if the potential motion events occur within the boundaries of a corresponding FOV (e.g., FOV 104A).

As will be described herein, in some examples, various objects or entities may be determined to be objects-of-interest (OOI), where an OOI may be a human (e.g., human 108), a vehicle (e.g., vehicle 110), or an animal (e.g., animal 112). An OOI may be an object or entity that a user desires to be informed of. For example, a user may wish to know when a human, vehicle, or animal is approaching, leaving, moving through, and/or otherwise in the vicinity of the user's residence (e.g., residential building 101). However, there may be instances in which the user does not wish to be informed about one or more types of objects or entities. In such examples, a respective STA onboard system associated with an electronic device (e.g., electronic device 102A) may be put into an operational mode (e.g., a "person-only mode") in which various "nuisance objects" are ignored. In practice and as will be described herein, a respective STA onboard system may classify a potential motion event associated with a vehicle (e.g., vehicle 110) and/or an animal (e.g., animal 11) as a false positive motion event when the STA onboard system is in a so-called person-only mode.

While FIG. 1 illustrates an example environment 100 that is an outdoor environment, it will be appreciated that various electronic devices (e.g., smart home devices, virtual assistants, robotic devices, security cameras) configured for indoor environments may also benefit from the incorporation of an STA onboard system as described herein. As such, the examples presented herein with reference to one or more components illustrated by FIG. 1 are included for purposes of explanation and are not intended to limit the scope or the spirit of the present disclosure.

Figure 2:
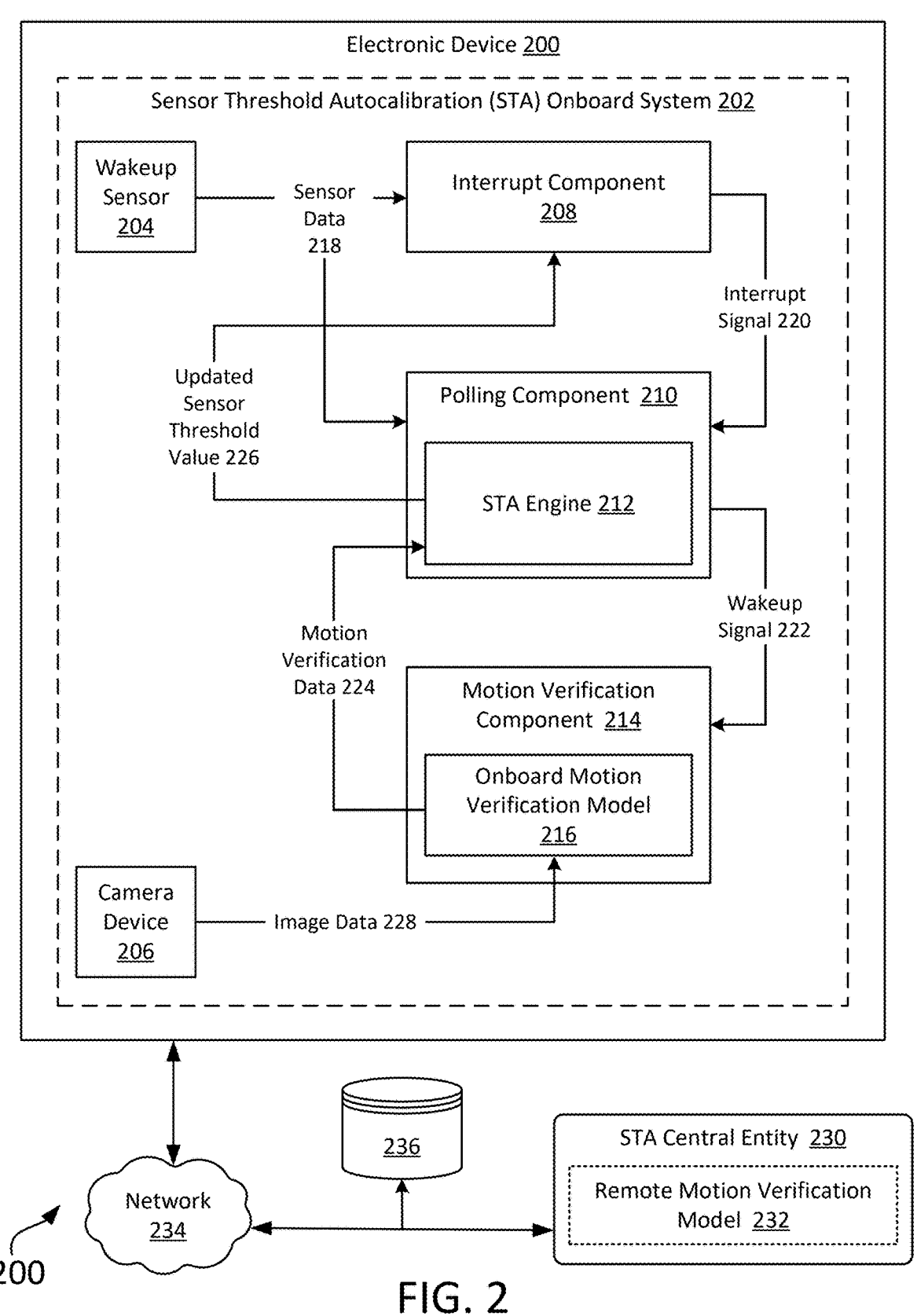
FIG. 2 illustrates an example system comprising an example electronic device integrated with an STA onboard system in accordance with various aspects of the present disclosure.

FIG. 2 illustrates an example system comprising an example electronic device 200 integrated with an STA onboard system 202 in accordance with various aspects of the present disclosure. In some examples, the electronic device 200 may be a smart doorbell (e.g., such as electronic device 102A depicted in FIG. 1). In various other examples, the electronic device 200 may be a security camera (e.g., such as electronic device 102B depicted in FIG. 1). The electronic device 200 comprising the STA onboard system 202 may be in communication with an STA central entity 230 comprising a remote motion verification model 232 and/or one or more non-transitory computer-readable memories 236 over a network 234.

Although the wakeup sensor 204 and the camera device 206 are depicted as separate components in FIG. 2, in some examples, the wakeup sensor 204 may be part of the camera device 206. Additionally or alternatively, the wakeup sensor 204 and/or the camera device 206 may be an existing wakeup sensor or camera device respectively associated with the electronic device 200. While FIG. 2 illustrates an example electronic device 200 comprising a single wakeup sensor 204, it is understood that various other example electronic device(s) 200 may comprise two or more wakeup sensors 204 capable of generating sensor data (e.g., sensor data 218) simultaneously and/or independently. In some examples, the two or more wakeup sensors 204 may be of a same type, while in other examples the two or more wakeup sensors 204 may be of different types. In this regard, a respective wakeup sensor 204 may be a PIR sensor, an accelerometer-based wakeup sensor, an ultra-wideband (UWB)-based wakeup sensor, a radar-based wakeup sensor, an ultrasound-based wakeup sensor, and/or any other type of motion sensor or disturbance detection sensor capable of detecting motion and/or disturbances with respect to a respective electronic device (e.g., electronic device 200). In some examples in which multiple (e.g., two) wakeup sensors are utilized, the STA onboard system 202 may be configured to manage (e.g., evaluate, dynamically update) multiple respective sensor threshold values (e.g., two sensor threshold values, each associated with a respective wakeup sensor) simultaneously and/or independently based on the methods described herein.

In some examples, the STA onboard system 202 may be implemented in one or more chips of the electronic device 200. For example, one or more of the techniques used by the STA onboard system 202 may be performed using an application specific integrated circuit (ASIC) and/or using a field programmable gate array (FPGA). In some other examples, various techniques of the STA onboard system 202 may be instantiated in software executed by one or more processors of the electronic device 200, the camera device 206 and/or the wakeup sensor 204. In yet other examples, the STA onboard system 202 may be instantiated using some combination of hardware and software.

Network 234 may be a communication network such as a local area network (LAN), a wide area network (such as the Internet), or some combination thereof. The one or more computing devices implementing the STA onboard system 202 may communicate with non-transitory computer-readable memory 236 (e.g., either locally or over network 234). In some examples, the non-transitory computer-readable memories 236 may store instructions that may be effective to perform one or more of the various techniques described herein. Furthermore, in some examples, the non-transitory computer-readable memories 236 may be a part of the electronic device 200.

As shown, the STA onboard system 202 may comprise the wakeup sensor 204, the camera device 206, an interrupt component 208, a polling component 210 comprising a STA engine 212, and/or a motion verification component 214. As shown the motion verification component 214 may comprise, leverage, and/or otherwise integrate with an onboard motion verification model 216.

As shown, the wakeup sensor 204 may be communicably coupled with one or more of the interrupt component 208 and/or the polling component 210. In some examples, the interrupt component 208 may be embodied by the wakeup sensor 204 and in other examples the interrupt component 208 may be distinct (e.g., separate) from the wakeup sensor 204. The polling component 210 may be a low-powered MCU configured to execute various sensor threshold value adjustment operations based in part on motion verification data 224 generated by the onboard motion verification model 216. In some examples, the polling component 210 may be configured to "poll" the wakeup sensor 204 to obtain sensor data 218 at a predetermined polling frequency. In this regard, the wakeup sensor 204 (e.g., a PIR sensor) may generate sensor data 218 comprising output samples (e.g., 64 samples per second or some other frequency, depending on the desired implementation) representing output magnitude values of the wakeup sensor 204. In some examples, generation of the sensor data 218 may be effective to cause the interrupt component 208 to compare the sensor data 218 to a previously configured sensor threshold value of the wakeup sensor 204. As will be described herein, the sensor threshold value may be dynamically adjusted during the operation of the electronic device 200.

The interrupt component 208 may be configured to compare the sensor data 218 to a previously configured sensor threshold value. If the sensor data 218 comprises samples (e.g., sensor measurements, readings) having a magnitude that exceeds the sensor threshold value, this may be indicative of a potential motion event and the interrupt component 208 may generate an interrupt signal 220. In some examples, the interrupt signal 220 may be generated by the interrupt component 208 based on determining the sensor data 218 comprises samples (e.g., sensor measurements, readings) having a magnitude that exceeds the sensor threshold value during a time other than the predetermined polling frequency (e.g., if a potential motion event occurs during a time in which the wakeup sensor 204 is not currently being polled by the polling component 210). The interrupt signal 220 may be configured to cause the polling component 210 to execute one or more operations. For example, the polling component 210 may be configured to provide a wakeup signal 222 to the motion verification component 214. In some examples, the motion verification component 214 may be a high-power MCU that is kept in a standby or sleep mode when not in use in order to lower power consumption and/or preserve battery life for the corresponding electronic device 200.

Once the motion verification component 214 is activated, the motion verification component 214 may cause the camera device 206 to begin capturing image data 228 associated with the environment in which the electronic device 200 is located (e.g., environment 100). The image data 228 may comprise video data (e.g., one or more video frames) and/or still image data associated with the potential motion event detected by the wakeup sensor 204 that caused the interrupt component 208 to generate the interrupt signal 220. Upon activation of the camera device 206, downstream processing may be initiated. For example, further motion detection processing pipelines and/or object detection pipelines may be initiated to further reduce false positives. For example, computer-vision techniques (such as human detection algorithms, object detection algorithms, and/or the like) may be used to determine whether motion is present and/or whether the motion should be used to trigger video capture and/or streaming.

In some examples, upon making a determination that video should be captured and/or streamed, the camera device 206 may begin capturing video, generating encoded video data (e.g., for storage or transmission), and/or sending encoded video to a remote computing device such as a remote computing system (e.g., the STA central entity 230) and/or a user device (e.g., a smart phone executing a companion application that is registered with the camera device 206). In some examples, the camera device 206 may continually capture a small amount of video stored in a rolling buffer (e.g., 2 seconds of video or less) so that events of interest captured while motion detection processing is occurring may be encoded and sent for viewing. In such examples, the contents of the rolling buffer may be encoded and sent to one or more designated remote computing devices followed by live video streaming until a designated period of time after motion is no longer detected.

In this regard and based on the image data 228, the onboard motion verification model 216 may classify the potential motion event as one of a true positive motion event or a false positive motion event. In various examples, classifying the potential motion event as a true positive motion event comprises determining that an object-of-interest (OOI) (e.g., human 108) is present within an FOV (e.g., FOV 104A) and/or an area-of-interest (e.g., area-of-interest 106A) based on one or more video frames in the image data 228. Additionally, classifying the potential motion event as a false positive motion event comprises determining that no objects-of-interest (e.g., no human(s) 108) are present within an FOV (e.g., FOV 104A) and/or an area-of-interest (e.g., area-of-interest 106A) based on one or more video frames in the image data 228. In some examples, an STA onboard system 202 may be put in a particular mode of operation (e.g., a person-only mode) such that various objects or entities identified by the motion verification model 216 may be classified as nuisance objects.

For example, if the STA onboard system 202 is in a person-only mode, a potential motion event associated with an identified nuisance object (e.g., a vehicle 110 and/or an animal 112) may be classified by the onboard motion verification model 216 as a false positive event due to the absence of any objects-of-interest (e.g., the absence of any human(s) 108). In this regard, the onboard motion verification model 216 may be trained using training instances of image data comprising labels indicating either a ground truth motion event or non-motion event related to various objects-of-interest, nuisance objects, and/or insignificant motions and interference. In some examples, the ground truth motion events or non-motion events may be labeled according to one or more particular modes of operation of a respective STA onboard system 202.

The onboard motion verification model 216 may be configured to generate motion verification data 224 that indicates (e.g., labels) a classified potential motion event as a true positive motion event (e.g., a motion event associated with an OOI) or false positive motion event (e.g., a motion event associated with a nuisance object and/or insignificant motion (e.g., environmental interference such as wind, sunshine, rain, temperature)). In some examples, the motion verification data 224 may be configured as an electronically managed data object comprising one or more data fields associated with various types of data related to the classification of a potential motion event. Additionally or alternatively, in some examples, the motion verification data 224 may be configured in a known data format (e.g., a JavaScript Object Notation (JSON) format, an extensible markup language (XML) format, or the like). In some examples, the motion verification data 224 may comprise a label or annotation associated with the potential motion event that indicates a particular class that the potential motion event belongs to (e.g., a true motion event label, a false motion event label). Additionally or alternatively, the motion verification data 224 may comprise sensor data (e.g., sensor data 218) associated with the potential motion event such that the correlation between the sensor data (e.g., a PIR magnitude value) and a particular label or classification (e.g., a true positive event label, a false positive event label) may be made by the STA engine 212. As shown, the motion verification data 224 may be provided to the polling component 210 and accessed by the STA engine 212. The STA engine 212 may be configured to determine whether the sensor threshold value of the wakeup sensor 204 needs to be adjusted (e.g., increased or decreased) based on various potential motion events classified by the onboard motion verification model 216 as well as the corresponding sensor data 218 (e.g., PIR magnitude values) associated with the various potential motion events.

If the STA engine 212 determines that a current sensor threshold value of the wakeup sensor 204 needs to be adjusted (e.g., increased or decreased) such that the sensitivity level of the wakeup sensor 204 is adjusted (e.g., increased or decreased), the STA engine 212 will generate an updated sensor threshold value 226. The polling component 210 may be configured to provide the updated sensor threshold value 226 to the interrupt component 208. Additionally or alternatively, in some examples, the polling component 210 may be configured to change and/or instantiate one or more settings and/or configurations associated with the wakeup sensor 204 based on an updated sensor threshold value 226. Additionally or alternatively, the polling component 210 may be configured to store the updated sensor threshold value 226 in memory (e.g., non-transitory computer-readable memory 236). Further detail related to the operation of the STA engine 212 will be provided herein with respect to FIG. 3.

As shown in FIG. 2, a respective STA onboard system 202 may be in communication with the STA central entity 230. In some examples, an electronic device 200 may not be equipped with the required processing circuitries and/or processing capacity to efficiently execute one or more of the STA operations described herein. For example, an electronic device 200 may not be equipped to efficiently execute the various CV and/or ML operations described herein (e.g., classifying potential motion events as true positive events of false positive events). In some such examples, the motion verification component 214 may not be configured to embody and/or leverage an onboard motion verification model 216. In such examples, sensor data 218 and/or image data 228 may be provided to the STA central entity 230 (e.g., via the network 234) so that the remote motion verification model 232 may conduct the various required classification operations.

In this regard, in some examples, the STA central entity 230 may be a server system associated with an enterprise, where the STA central entity 230 comprises more powerful and/or differently-configured processing circuitry relative to a respective electronic device 200. In some examples, the remote motion verification model 232 may be similarly trained and similar in functionality to the onboard motion verification model 216. For example, the remote motion verification model 232 may be configured to detect and/or classify true positive motion events and/or false positive motion events associated with objects-of-interest (e.g., human(s) 108, vehicle(s) 110, and/or animal(s) 112). In such examples, the remote motion verification model 232 may be configured to generate motion verification data 224 based on classifying image data 228 received from the camera device 206 over the network 234. The STA central entity 230 may provide the motion verification data 224 generated by the remote motion verification model 232 to the polling component 210.

Alternatively, in some examples, an electronic device (e.g., electronic device 200) may be a hybrid electronic device comprising an STA onboard system 202 and integrated with an STA central entity 230 such that various object detection tasks and/or object classification tasks are divided between the onboard motion verification model 216 and the remote motion verification model 232. In some such examples, a respective STA onboard system 202 may be configured according to various user preferences indicating a desired operational mode and/or various preferred operational constraints (e.g., by way of a software application instance configured to enable a user to alter one or more settings related to the corresponding electronic device (e.g., electronic device 200) or STA onboard system 202). As described herein, in some examples, an STA onboard system 202 may be configured in a person-only mode in which only potential motion events associated with humans (e.g., human(s) 108) will be classified as a true positive motion events. Alternatively, in other examples, the STA onboard system 202 may be configured such that different types of objects may be classified as objects-of-interest. For example, the STA onboard system 202 may be configured such that both humans (e.g., human(s) 108) and vehicles (e.g., vehicle(s) 110) are considered objects-of-interest for which corresponding potential motion events will be classified as true positive motion events, while other objects such as animals (e.g., animal(s) 112) are considered nuisance objects for which corresponding potential motion events will be classified as false positive motion events. In this regard, the STA onboard system 202 may be configured according to various user preferences such that many different combinations of objects-of-interest and nuisance objects may be selected to be detected and/or identified by the corresponding electronic device 200.

In some such examples, the remote motion verification model 232 may be configured to detect and/or classify potential motion events associated with different objects than the onboard motion verification model 216 based on the same image data 228. For example, the onboard motion verification model 216 may be configured to detect and/or classify a first type of object (e.g., human(s) 108) or a first set of object types (e.g., human(s) 108 and vehicle(s) 110), where the remote motion verification model 232 may be configured to detect and/or classify a second type of object (e.g., animal(s) 112) or a second set of object types (e.g., animal(s) 112 and vehicle(s) 110). In this manner, various object detection tasks and/or object classification tasks may be divided between the onboard motion verification model 216 and the remote motion verification model 232. Dividing such tasks in this manner may provide the benefit of reducing the computational resource consumption and/or the power consumption (e.g., consumption of batter life) of a respective edge device (e.g., electronic device 200) integrated with a respective STA onboard system 202.

Figure 3:
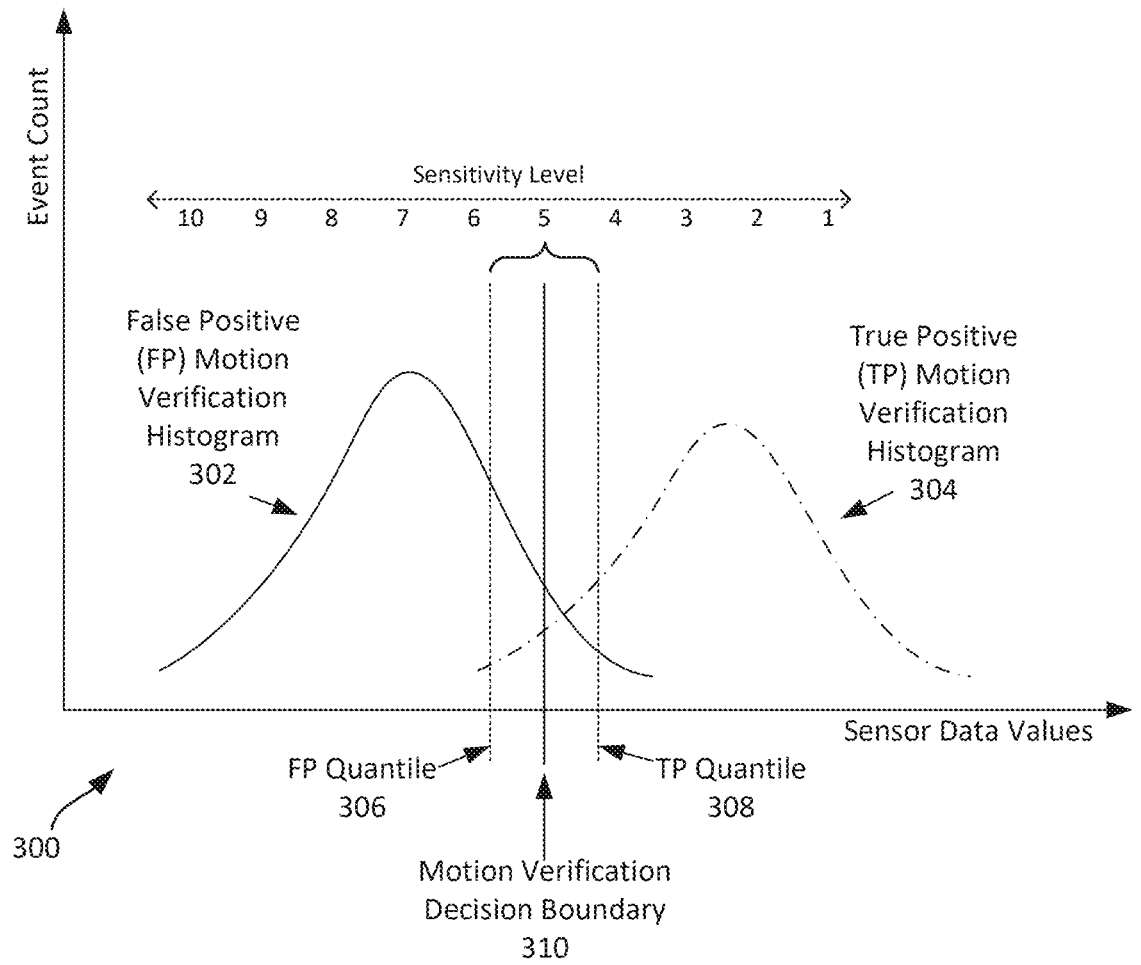
FIG. 3 depicts an example graph illustrating how a decision boundary associated with a respective sensor threshold value may be determined in accordance with various aspects of the present disclosure.

FIG. 3 depicts an example graph 300 illustrating how a decision boundary associated with a respective sensor threshold value may be determined in accordance with various aspects of the present disclosure. In some examples, the STA engine 212 may utilize a sliding time window while dynamically adjusting a sensor threshold value for a respective wakeup sensor 204. The sliding time window may correspond to a predetermined amount of time (e.g., a two-, four-, or 8-hour period, or any other suitable period of time). As the sliding time window progresses, the STA engine 212 may "roll off" (e.g., disregard, forget, delete) various data generated and/or otherwise aggregated at times prior to the current position of the sliding time window.

The STA engine 212 may track (e.g., store, compile, process) the respective amounts of true positive motion events and false positive motion events classified by the onboard motion verification model 216 during the sliding time window based on various motion verification data 224. Additionally, the STA engine 212 may track the sensor data 218 corresponding to the respective true positive motion events and false positive motion events. For example, as illustrated by the graph 300, an event count associated with the true positive motion events and false positive motion events that occurred during the sliding window may be plotted on the y-axis, and sensor data values (e.g., the absolute values of sensor data values) indicated by the corresponding sensor data 218 (e.g., PIR magnitude values) may be plotted on the x-axis.

Based on this data, empirical distributions can be estimated for the classes associated with the true positive motion events and false positive motion events. As shown, the false positive (FP) motion verification histogram 302 is associated with an empirical distribution representative of the FP motion events classified by the onboard motion verification model 216 during the sliding time window and the corresponding sensor data 218. Also as shown, the true positive (TP) motion verification histogram 304 is associated with an empirical distribution representative of the TP motion events classified by the onboard motion verification model 216 during the sliding time window and the corresponding sensor data 218.

In some examples, the FP motion verification histogram 302 may represent the noise level and/or insignificant motion captured by the wakeup sensor 204 such that the motion verification decision boundary 310 effectively separates TP motion events from FP motion events. The STA engine 212 may be configured to continuously determine the motion verification decision boundary 310 during the sliding time window as various TP motion events and/or FP motion events occur and may dynamically adjust the sensor threshold value associated with the wakeup sensor 204 accordingly. In some examples, an FP quantile 306 is calculated based on the FP motion verification histogram 302. Similarly, a TP quantile 308 is calculated based on the TP motion verification histogram 304. In some examples, the FP quantile 306 and/or the TP quantile 308 may be associated with a particular percentile associated with the FP motion verification histogram 302 and/or TP motion verification histogram 304, respectively. For example, the FP quantile 306 may be associated with a particular quartile (e.g., a third quartile, aka. "upper" quartile associated with the $75^{th}$ percentile). In other examples, the FP quantile 306 may be associated with a particular percentile (e.g., $85^{th}$ percentile, $90^{th}$ percentile, or any other suitable percentile). Similarly, the TP quantile 308 may be associated with a particular quartile (e.g., a first quartile, aka. "lower" quartile associated with the $25^{th}$ percentile). In other examples, the TP quantile

308 may be associated with a particular percentile (e.g., $10^{th}$ percentile, $15^{th}$ percentile, or any other suitable percentile).

In some examples, the STA engine 212 may determine the motion verification decision boundary 310 based on the FP quantile 306 and the TP quantile 308, where the motion verification decision boundary 310 is chosen from an interval between the FP quantile 306 and the TP quantile 308. In such examples, the motion verification decision boundary 310 may be associated with a weighted sum calculated based on values associated with the FP quantile 306 and the TP quantile 308. Furthermore, the relative positions of the FP quantile 306, the TP quantile 308, and the motion verification decision boundary 310 may correspond to a sensitivity level associated with the wakeup sensor 204. In this regard, the STA engine 212 may determine respective weights to be applied to the values of the FP quantile 306 and the TP quantile 308 based on the current (e.g., user-selected) sensitivity level associated with the wakeup sensor 204. For example, a higher sensitivity level (e.g., sensitivity level 9) may cause the STA engine 212 to apply a relatively higher weight (e.g., 0.75, or any other suitable value) to the value associated with the FP quantile 306 and a relatively lower weight (e.g., 0.2, or any other suitable value) to the value associated with the TP quantile 308. As such, the weighted sum associated with the motion verification decision boundary 310 may skew towards the value associated with the FP quantile 306.

Similarly, a lower sensitivity level (e.g., sensitivity level 2) may cause the STA engine 212 to apply a relatively higher weight (e.g., 0.75, or any other suitable value) to the value associated with the TP quantile 308 and a relatively lower weight (e.g., 0.2, or any other suitable value) to the value associated with the FP quantile 306. As such, the weighted sum associated with the motion verification decision boundary 310 may skew towards the value associated with the TP quantile 308. In this regard, in examples in which the motion verification decision boundary 310 is associated with a weighted sum, the weights applied to the FP quantile 306 and the TP quantile 308 in order to determine the weighted sum may cause the motion verification decision boundary 310 to skew in one direction or another within the interval associated with the FP quantile 306 and the TP quantile 308 based on the sensitivity level of the wakeup sensor 204.

In some examples, the STA engine 212 may determine the updated sensor threshold value 226 based on the weighted sum associated with the motion verification decision boundary 310. The STA engine 212 may determine an updated sensor threshold value 226 by modifying a current sensor threshold value by a first amount, where the first amount is determined based on the motion verification decision boundary 310. For example, the first amount may be determined based on the difference between the current sensor threshold value of the wakeup sensor 204 and a value associated with the motion verification decision boundary 310 (e.g., a weighted value calculated based on values of the FP quantile 306 and the TP quantile 308). Alternatively, in some examples, the STA engine 212 may determine that a current sensor threshold value should not be modified (e.g., increased or decreased) such that an updated sensor threshold value 226 is not generated and the current sensor threshold value is persisted. For example, if the STA engine 212 determines that a numerical difference between the current sensor threshold value of the wakeup sensor 204 and a value associated with the motion verification decision boundary 310 (e.g., a weighted value calculated based on values of the FP quantile 306 and the TP quantile 308) is a negligible difference (e.g., below a predetermined threshold), the STA engine 212 may determine that the current sensor threshold value should persist until conditions warrant the generation of an updated sensor threshold value 226 (e.g., based on the classification of future potential motion events).

In some examples, the sensitivity level associated with a wakeup sensor 204 may be selected by a respective user (e.g., by way of a software application instance configured to enable a user to alter one or more settings related to the corresponding electronic device (e.g., electronic device 102A) or STA onboard system 202). For example, consider a wakeup sensor 204 configured to have ten sensitivity levels with sensitivity level 1 being the least sensitive and sensitivity level 10 being the most sensitive. If the motion sensitivity level is set to sensitivity level 1, only potential motion events corresponding to sensor data 218 having relatively high values (e.g., high PIR magnitude values) may be detected, with a high likelihood that only TP motion events will be detected by the onboard motion verification model 216 (e.g., as illustrated by graph 300).

Conversely, if the motion sensitivity level is set to sensitivity level 10, many more potential motion events corresponding to sensor data 218 having a large range of values (e.g., PIR signals having both low and high magnitude values) may be detected, with a high likelihood that the majority of potential motion events detected by the onboard motion verification model 216 would be FP motion events. In this regard, the relative positions of the FP quantile 306, the TP quantile 308, and the motion verification decision boundary 310 may shift according to the current sensitivity level associated with the wakeup sensor 204. For example, as shown by graph 300, the relative positions of the FP quantile 306, the TP quantile 308, and the motion verification decision boundary 310 may shift to higher values as the sensitivity level is decreased (e.g., towards sensitivity level 1) and may shift to lower values as the sensitivity level is increased (e.g., towards sensitivity level 10). As such, in some examples, the STA engine 212 takes into account the currently selected sensitivity level of the wakeup sensor 204 when continuously determining the motion verification decision boundary 310 during the sliding time window.

In some cases, it may be desirable to detect and/or classify an acceptable ratio of both TP motion events and FP motion events in order to determine whether the current sensor threshold value is too high or too low. In some examples, the absence of either TP motion events and/or FP motion events for a predetermined amount of time may indicate that the current sensor threshold is set too low or too high. In this regard, the STA engine 212 may determine whether a value associated with the FP quantile 306 is below a predetermined threshold for a predetermined amount of time (e.g., a one-, four-, or six-hour period, or any other suitable amount of time). In such an instance, this may indicate the sensor threshold value is too high and that TP motion events are likely being missed. In such an example, the STA engine 212 may determine an updated sensor threshold value 226 by decreasing the current sensor threshold value (e.g., and thereby increase the sensitivity of the wakeup sensor 204).

Additionally, the STA engine 212 may determine whether a value associated with the TP quantile 308 is below a predetermined threshold for a predetermined amount of time (e.g., a one-, four-, or six-hour period, or anything other suitable amount of time). In such an instance, this may indicate the sensor threshold value is too low and that FP motion events are consuming too much energy (e.g., draining battery). In such an example, the STA engine 212 may determine an updated sensor threshold value 226 by increasing the current sensor threshold value (e.g., and thereby decreasing the sensitivity of the wakeup sensor 204).

In some cases, the STA engine 212 may determine, based on motion verification data 224 received from the onboard motion verification model 216, that only TP motion events have been detected for a predetermined amount of time (e.g., a one-, four-, or six-hour period, or any other suitable amount of time). In such a case, the sensor threshold value may be too high such that some TP motion events are likely being missed. As such, the STA engine 212 may determine an updated sensor threshold value 226 by decreasing the current sensor threshold value.

In other cases, the STA engine 212 may determine, based on motion verification data 224 received from the onboard motion verification model 216, that only FP motion events have been detected for a predetermined amount of time (e.g., a one-, four-, or six-hour period, or anything other suitable amount of time). In such a case, the sensor threshold value may be too low, and FP motion events may be consuming too much power (e.g., draining battery). As such, the STA engine 212 may determine an updated sensor threshold value 226 by increasing the current sensor threshold value.

In other cases, the STA engine 212 may determine that no FP motion events, and no TP motion events have been detected for a first predetermined amount of time (e.g., a one-, four-, or six-hour period, or any other suitable amount of time). In such a case, the STA engine 212 may be configured to initiate a countdown timer associated with a second predetermined amount of time (e.g., thirty minutes, one hour, or any other suitable amount of time). If the countdown timer expires and the STA engine 212 determines that no false positive motion events and no true positive motion events have occurred within the second predetermined amount of time, this may indicate that the current sensor threshold is too high. In such a case, the STA engine 212 may generate an updated sensor threshold value 226 by modifying the current sensor threshold value (e.g., by decreasing the current sensor threshold value).

Figure 4:
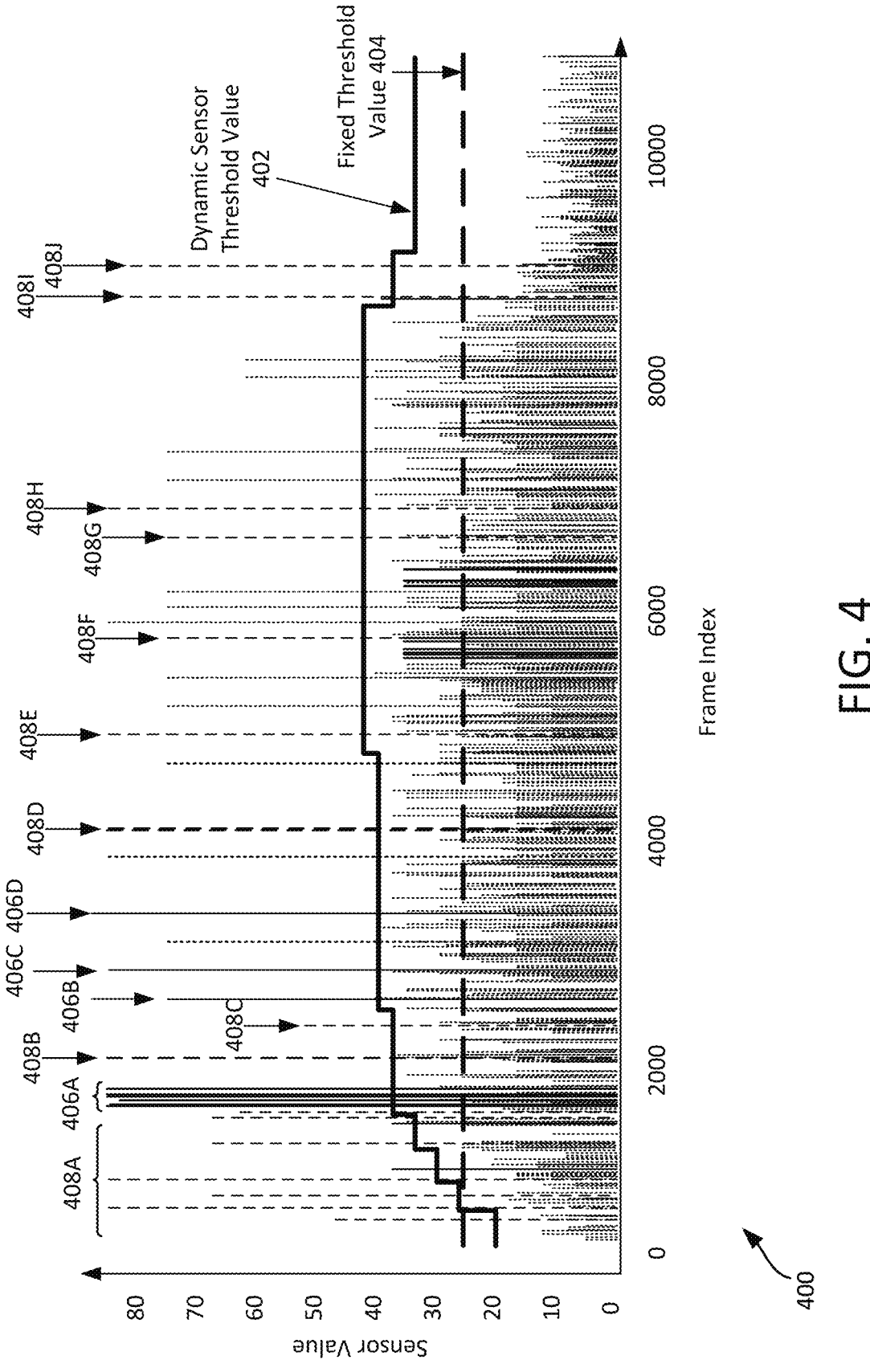
FIG. 4 depicts an example graph illustrating an automatically calibrated sensor threshold value in accordance with various aspects of the present disclosure.

FIG. 4 depicts an example graph 400 illustrating an automatically calibrated sensor threshold value in accordance with various aspects of the present disclosure. The graph 400 has been formatted for use in describing aspects of the present disclosure and is not necessarily to scale. The horizontal axis of the graph 400 is associated with a frame index that shows the amount of sensor samples of respective sensor data 218 captured by a respective electronic device (e.g., electronic device 102A) over time (shown as vertical lines). The vertical axis represents the absolute values of the respective sensor samples (e.g., absolute PIR signal magnitude values). The illustrated sensor sample values correspond to roughly 3.5 hours of time (e.g., sensor samples have been down-sampled to one frame per second).

Sensor samples 406A-406D (illustrated as solid vertical lines) indicate true positive motion events associated with the movement of object-of-interest (e.g., a human 108, an animal 112, a vehicle 110) within the boundaries of an area-of-interest (e.g., area-of-interest 106A). Sensor samples 408A-408J (illustrated as long-dashed vertical lines) indicate false positive motion events associated with the movement of objects-of-interest (e.g., an animal 112, a vehicle 110) outside the boundaries of an area-of-interest (e.g., area-of-interest 106A), but within an FOV (e.g., FOV 104A) of the respective electronic device (e.g., electronic device 102A). The other sensor samples (illustrated as short-dashed lines) indicate insignificant motion (e.g., motion caused by environmental interference, distant objects, and/or the like.

The fixed threshold value 404 represents a fixed threshold value associated with a conventional motion detection system. The dynamic sensor threshold value 402 represents a sensor threshold value that has been adjusted over time according to the techniques described herein to mitigate excess interference and/or false positive motion events. The image data 228 corresponding to the sensor data 218 illustrated by graph 400 indicates that the sun shined on the respective electronic device (e.g., electronic device 102A) during sunset, causing interference (e.g., environment interference causing higher relative PIR magnitude values) from frames circa 1300 to 8400.

As shown, when the fixed threshold value 404 (e.g., a constant sensor threshold value of 25) is used, sensor signals (e.g., PIR magnitude signals) surpassed the fixed threshold value 404 very frequently and initialized many false positive motion events. In contrast and as shown, the STA engine 212 detected the increased number of false positive motion events and raised the dynamic sensor threshold value 402 to about 40, effectively reducing the number of false wakeups, insignificant motion events, and interference that would have led to the classification of many false positive motion events and the subsequent consumption of power (e.g., battery power). As shown, after about frame 9000, sensor values drop, and no motion events are verified by the onboard motion verification model 216. The STA engine 212 detects the decrease in verified motion events and decreases the dynamic sensor threshold value 402.

Figure 5:
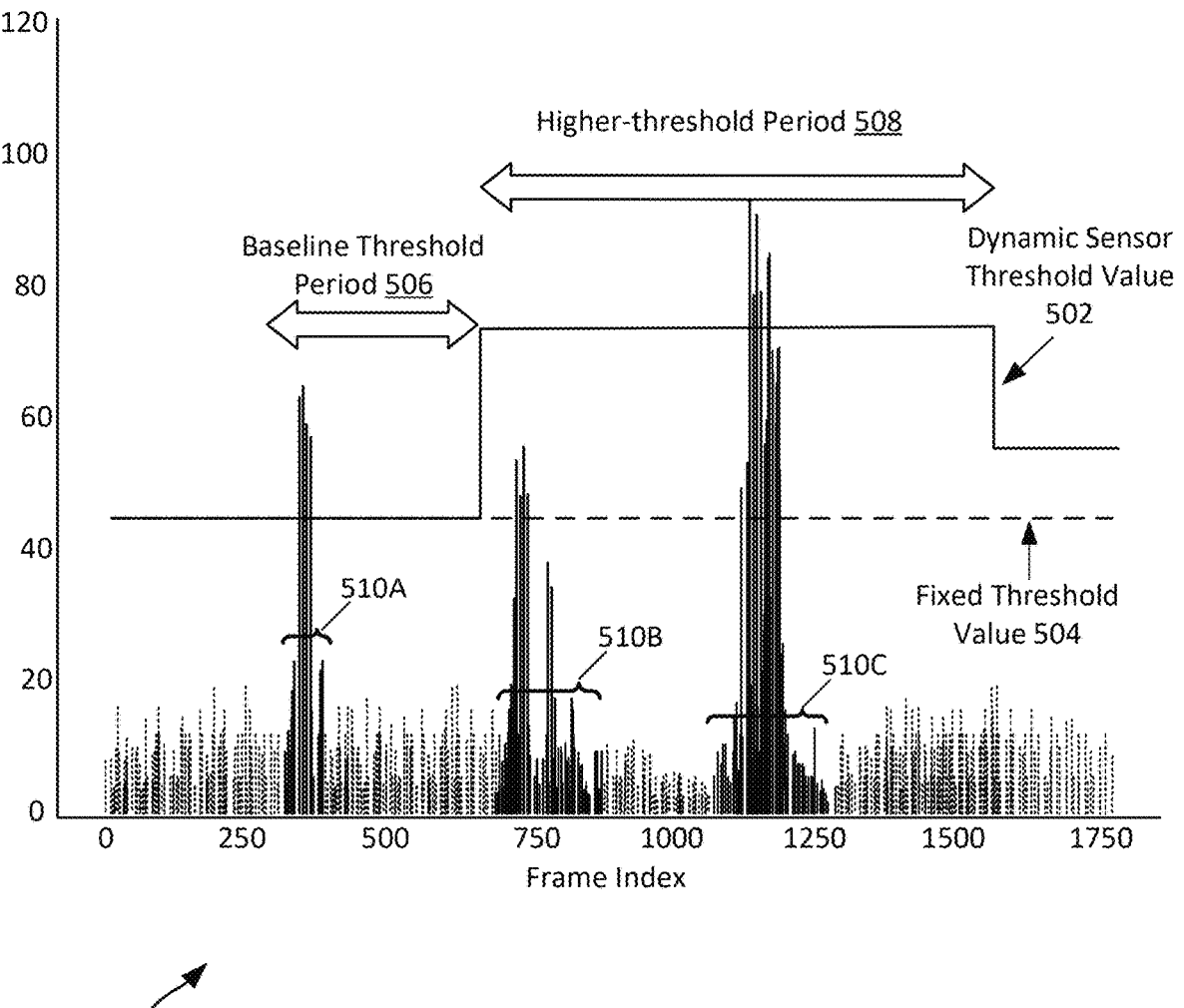
FIG. 5 depicts an example graph illustrating a higher-threshold period for a respective sensor threshold in accordance with various aspects of the present disclosure.

FIG. 5 depicts an example graph 500 illustrating a higher-threshold period 508 for a respective STA onboard system 202 in accordance with various aspects of the present disclosure. In various examples, the STA engine 212 may be configured to temporarily increase the current sensor threshold value of the wakeup sensor 204. It may be advantageous to do so in cases in which multiple consecutive motion events (e.g., consecutive FP motion events) occur within a short period of time. For example, if the onboard motion verification model 216 determines that a potential motion event is associated with a nuisance object (e.g., a vehicle 110) traversing an area-of-interest (e.g., area-of-interest 106A), the STA engine 212 may generate an updated sensor threshold value 226 (e.g., an increased sensor threshold value) and cause the wakeup sensor 204 to utilize the updated sensor threshold value 226 for a predetermined duration of time associated with a higher-threshold period (e.g., higher-threshold period 508). In some examples, the STA engine 212 may generate the updated sensor threshold value 226 to be 110% of a sensor sample value in the sensor data 218 that triggered the higher-threshold period (e.g., the sensor data 218 associated with the potential motion event that caused the onboard motion verification model 216 to analyze the corresponding image data 228).

In examples, a higher-threshold period (e.g., higher-threshold period 508) may correlate with a predetermined amount of time (e.g., 1 minute, 5 minutes, 15 minutes, or any other suitable amount of time). In some examples, if one or more motion events (e.g., FP motion events associated with nuisance objects) occur during a higher-threshold period, the STA engine 212 may extend the higher-threshold period for an additional amount of time. In this regard, the STA engine 212 may be configured to employ various motion frequency modes for a respective STA onboard system 202.

For example, the STA engine 212 may be configured to employ a "regular" frequency mode in which an initial higher-threshold period of one minute is initiated if a FP motion event is detected (e.g., a first nuisance object such as an animal 112 is detected within an area-of-interest 106A).

In regular frequency mode, if the STA onboard system 202 is currently in a first higher-threshold period (e.g., the initial one-minute period) and a subsequent FP motion event is detected (e.g., a second nuisance object such as a vehicle 110 is detected with the area-of-interest 106A), the STA engine 212 may increase the higher-threshold period to five minutes. In this manner, in regular frequency mode, the higher-threshold period may increase from the initial period of one minute, to the second period of five minutes, to a maximum of fifteen minutes.

As another example, the STA engine 212 may be configured to employ a "periodic" frequency mode in which an initial higher-threshold period of two minutes is initiated if a FP motion event is detected (e.g., a first nuisance object such as an animal 112 is detected within an area-of-interest 106A). In periodic frequency mode, if the STA onboard system 202 is currently in a first higher-threshold period (e.g., the initial two-minute period) and a subsequent FP motion event is detected (e.g., a second nuisance object such as a vehicle 110 is detected with the area-of-interest 106A), the STA engine 212 may increase the higher-threshold period to ten minutes. In this manner, in period frequency mode, the higher-threshold period may increase from the initial period of two minutes to the second period of ten minutes, to a maximum of thirty minutes.

As shown, the graph 500 compares the use of a fixed threshold value 504 (e.g., a sensor threshold value of about 45) and the use of a dynamic sensor threshold value 502 (e.g., a sensor threshold value that has been dynamically adjusted according to various techniques described herein). As shown, the vertical axis of the graph 500 tracks sensor values associated with various sensor data 218 related to various TP motion events and FP motion events that occurred during a respective sliding window. The horizontal axis is associated with a frame index that shows sensor samples of the respective sensor data 218 captured by a respective electronic device (e.g., electronic device 102A) over time (shown as vertical lines).

In some conventional motion detection systems, one or more components (e.g., wakeup sensors) are "snoozed" (e.g., deactivated, paused) for a period of time upon the detection of a nuisance object (e.g., an animal) and/or interference (e.g., insignificant motion) within a respective FOV in an attempt to prevent the detection and processing of subsequently detected nuisance objects or interference. However, snoozing various components (e.g., wakeup sensors) of a motion detection system for a period of time introduces inherent security risks. For instance, if one or more components of a motion detection system are snoozed, objects-of-interest (e.g., humans) may go undetected.

As shown on the graph 500, the sensor samples 510A indicate an FP motion event associated with a nuisance object (e.g., a vehicle 110) detected within an area-of-interest (e.g., area-of-interest 106A) during a baseline threshold period 506 (e.g., a period of normal operation). As illustrated, after detecting the nuisance object, the STA onboard system 202 may be configured to enter into a higher-threshold period 508 in which the dynamic sensor threshold value 502 is raised from about 45 to 75. As shown, the higher-threshold period 508 lasts for a period of time corresponding to frames 675 to 1575, during which a second nuisance object (e.g., an animal 112) associated with the sensor samples 510B is ignored by the STA onboard system 202. In this example, if the fixed threshold value 504 is used, the second nuisance object would be detected and classified unnecessarily.

Further as shown, the sensor samples 510C indicate a TP motion event associated with an OOI (e.g., a human 108) is detected within the area-of-interest (e.g., area-of-interest 106A) even though the STA onboard system 202 is in the higher-threshold period 508. In this manner, the STA onboard system 202 may be configured to mitigate unwanted processing and energy consumption (e.g., battery drain) caused by nuisance objects while still successfully detecting objects-of-interest. Furthermore, if a motion detection system were to snooze one or more components (e.g., a wakeup sensor) after the detection of the first nuisance object associated with the sensor samples 510A for a duration similar to the higher-threshold period 508, the motion detection system would have failed to detect the OOI (e.g., a human 108) associated with the sensor samples 510C.

As shown, once the higher-threshold period 508 has expired, the STA engine 212 may be configured to lower the dynamic sensor threshold value 502. In some examples, after a higher-threshold period (e.g., higher-threshold period 508) expires, the STA engine 212 may lower the sensor threshold value (e.g., the dynamic sensor threshold value 502) of the wakeup sensor 204 by a predetermined amount. For example, the STA engine 212 may lower the sensor threshold value (e.g., the dynamic sensor threshold value 502) by a predetermined percentage (e.g., 60%, 75%, or any other suitable percentage) of the sensor threshold value associated with the higher-threshold period. In various other examples, after a higher-threshold period (e.g., higher-threshold period 508) expires, the STA engine 212 may lower the sensor threshold value (e.g., the dynamic sensor threshold value 502) of the wakeup sensor 204 back to sensor threshold value associated with a preceding baseline threshold period (e.g., baseline threshold period 506).

FIG. 6 depicts an example process 600 related to sensor threshold autocalibration, in accordance with various aspects of the present disclosure. The actions of the process 600 may represent a series of instructions comprising computer readable machine code executable by a processing unit of an electronic device (e.g., electronic device 200) integrated with an STA onboard system 202, although various operations may be implemented in hardware. In various examples, the computer readable machine code may be comprised of executable instructions selected from a native instruction set of the processor(s) and/or an operating system of the electronic device (e.g., electronic device 200).

Process 600 may begin at action 602, at which first sensor data (e.g., sensor data 218) is generated by a first wakeup sensor (e.g., wakeup sensor 204) during a sliding time window. In some examples, the first wakeup sensor may be a PIR sensor and the first sensor data may be PIR signal magnitude data. In some other examples, the first wakeup sensor may be an accelerometer and the first sensor data comprises a value indicating a change in velocity of an electronic device comprising the first wakeup sensor.

Processing may continue at action 604, at which an interrupt component (e.g., interrupt component 208) determines that the first sensor data (e.g., sensor data 218) represents a first potential motion event based on a comparison of the first sensor data with a first sensor threshold value associated with the first wakeup sensor (e.g., wakeup sensor 204).

Processing may continue at action 606, at which a motion verification component (e.g., motion verification component 214) controls a first camera device to capture first video data comprising one or more video frames. In some examples, the motion verification component controls the first camera device in response to determining that the first sensor data satisfies the first sensor threshold value.

Processing may continue at action 608, at which an onboard motion verification model (e.g., onboard motion verification model 216) classifies the first potential motion event as one of a true positive motion event or a false positive motion event based on the one or more video frames. In some examples, classifying the first potential motion event as a true positive motion event comprises determining that an object-of-interest (e.g., a human 108) is present within an area-of-interest (e.g., area-of-interest 106A) of an environment (e.g., environment 100) indicated in the one or more video frames.

Processing may continue at action 610, at which first motion verification data labeling the first potential motion event as a first true positive motion event is generated by the onboard motion verification model (e.g., onboard motion verification model 216). As described herein, the onboard motion verification model (e.g., onboard motion verification model 216) may be configured to classify a potential motion event as one of a true positive motion event (e.g., a motion event associated with an OOI) or a false positive motion event (e.g., a motion event associated with a nuisance object and/or insignificant motion (e.g., environmental interference such as wind, sunshine, rain, temperature)).

Processing may continue at action 612, at which an STA engine (e.g., STA engine 212) determines a motion verification decision boundary (e.g., motion verification decision boundary 310). In some examples, the motion verification decision boundary (e.g., motion verification decision boundary 310) is determined based on a first quantile (e.g., FP quantile 306) of a first empirical distribution associated with a first set of false positive motion events that occurred during the sliding time window and a second quantile (e.g., TP quantile 308) of a second empirical distribution associated with a first set of true positive motion events that occurred during the sliding time window. In some such examples, the first set of true positive motion events comprises the first true positive motion event.

Processing may continue at action 614, at which the STA engine (e.g., STA engine 212) determines a first updated sensor threshold value (e.g., updated sensor threshold value 226) by modifying the first sensor threshold value by a first amount. In some examples, the first amount is determined based on the motion verification decision boundary (e.g., motion verification decision boundary 310). In some such examples, the motion verification decision boundary is within an interval associated with the first quantile (e.g., FP quantile 306) and the second quantile (e.g., TP quantile 308).

Additionally or alternatively, some examples, the STA engine (e.g., STA engine 212) may determine that a value associated with the first quantile (e.g., FP quantile 306) is below a predetermined threshold for a first predetermined amount of time. In such examples, determining the first updated sensor threshold value (e.g., updated sensor threshold value 226) comprises decreasing the first sensor threshold value. Additionally or alternatively, some examples, the STA engine (e.g., STA engine 212) may determine that a value associated with the second quantile (e.g., TP quantile 308) is below a predetermined threshold for a first predetermined amount of time. In such examples, determining the first updated sensor threshold value (e.g., updated sensor threshold value 226) comprises increasing the first sensor threshold value.

Processing may continue at action 616, at which the STA engine (e.g., STA engine 212) stores the first updated sensor threshold value (e.g., updated sensor threshold value 226) in memory.

Furthermore, in some examples, the STA engine (e.g., STA engine 212) may determine that no false positive motion events and no true positive motion events have occurred for at least a first predetermined amount of time. In such examples, the STA engine (e.g., STA engine 212) may be configured to initiate a countdown timer associated with a second predetermined amount of time. The STA engine (e.g., STA engine 212) may determine, based on an expiration of the countdown timer, that no false positive motion events and no true positive motion events have occurred within the second predetermined amount of time. In such examples, the STA engine may determine, based on a determination that no false positive motion events and no true positive motion events have occurred within the second predetermined amount of time, a second updated sensor threshold value by modifying the first updated sensor threshold value by a second amount. In such examples, the STA engine (e.g., STA engine 212) may store the second updated sensor threshold value in memory.

FIG. 7 depicts another example process 700 related to a higher-threshold period instantiated by an STA onboard system, in accordance with various embodiments of the present disclosure. The actions of the process 700 may represent a series of instructions comprising computer readable machine code executable by a processing unit of an electronic device (e.g., electronic device 200) integrated with an STA onboard system 202, although various operations may be implemented in hardware. In various examples, the computer readable machine code may be comprised of executable instructions selected from a native instruction set of the processor(s) and/or an operating system of the electronic device (e.g., electronic device 200). In some examples, the process 700 may begin subsequent to (or as a result of) one or more operations associated with the process 600 described herein with reference to FIG. 6 (e.g., subsequent to the execution of action 616).

Process 700 may begin at action 702, at which the first wakeup sensor (e.g., wakeup sensor 204) generates second sensor data (e.g., sensor data 218) during the sliding time window.

Processing may continue at action 704, at which the interrupt component (e.g., interrupt component 208) determines that the second sensor data represents a second potential motion event based on a comparison of the second sensor data with the first updated sensor threshold value (e.g., updated sensor threshold value 226).

Processing may continue at action 706, at which the motion verification component (e.g., motion verification component 214) controls the first camera device to capture second video data comprising one or more video frames. In some examples, the motion verification component (e.g., motion verification component 214) controls the first camera device in response to determining that the second sensor data satisfies the first updated sensor threshold value.

Processing may continue at action 708, at which the onboard motion verification model (e.g., onboard motion verification model 216) generates, based on the second video data, second motion verification data labeling the second potential motion event as a first false positive motion event. In some examples, labeling the second potential motion event as a first false positive motion event comprises determining that a nuisance object (e.g., a vehicle 110) is present within the area-of-interest (e.g., area-of-interest 106A).

Processing may continue at action 710, at which the STA engine (e.g., STA engine 212) determines a second updated sensor threshold value by increasing the first updated sensor threshold value by a second amount. In some examples, the second updated sensor threshold value is used for a first predetermined amount of time. For example, as described herein, after detecting the nuisance object (e.g., a vehicle 110) the STA onboard system 202 may be configured to enter into a higher-threshold period (e.g., higher-threshold period 508) in which the current sensor threshold value is raised for a predetermined amount of time (e.g., 1 minute, 5 minutes, 15 minutes, or any other suitable amount of time). In some examples, as described herein, a respective higher-threshold period (e.g., higher-threshold period 508) is associated with a frequency mode, where the frequency mode may indicate the predetermined amount of time for which the current sensor threshold value is to be raised.

Processing may continue at action 712, at which the second updated sensor threshold value is stored in memory.

Figure 8:
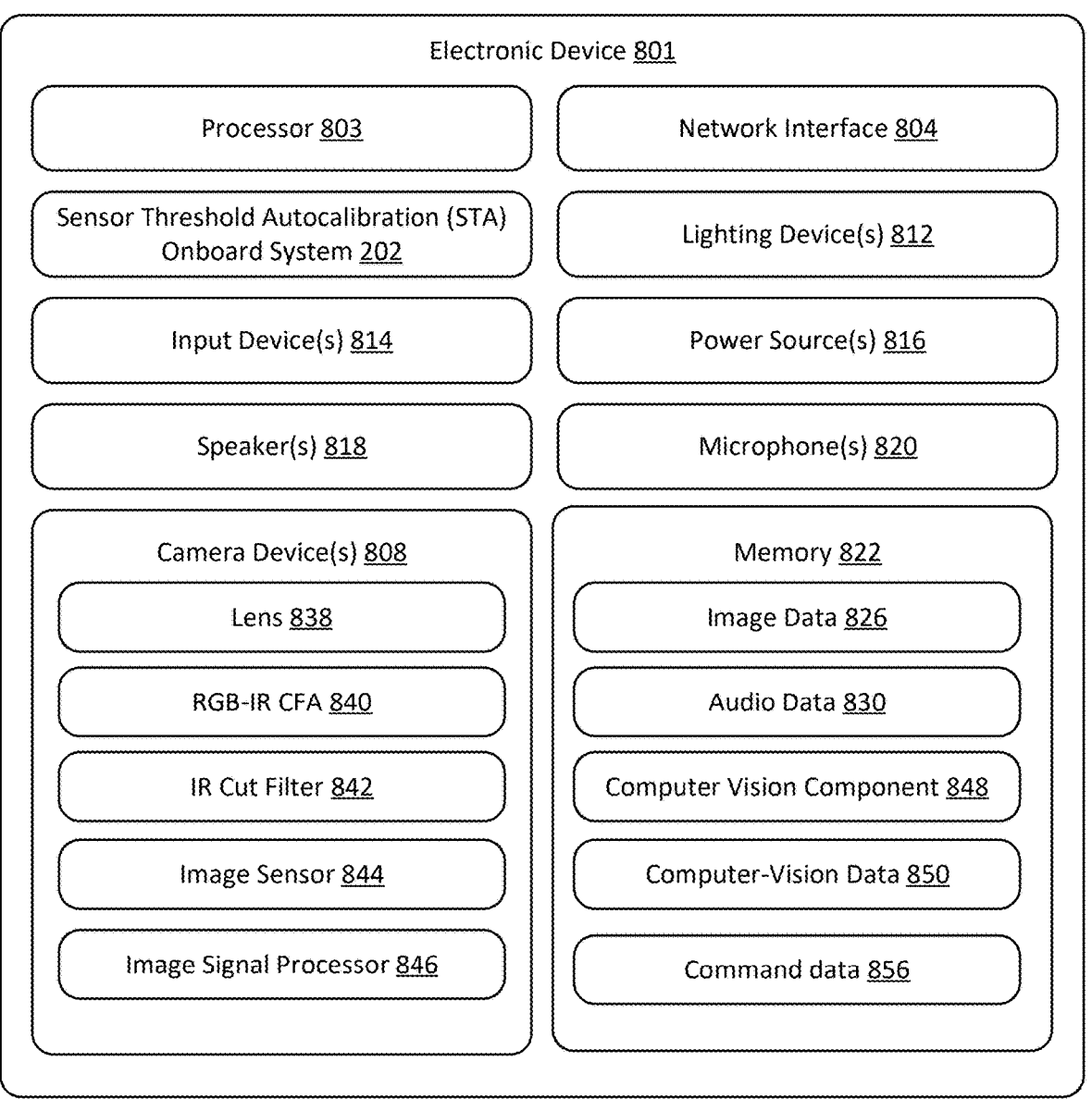
FIG. 8 illustrates an example electronic device incorporating an STA onboard system in accordance with various aspects of the present disclosure.

FIG. 8 depicts an example device that may implement a motion detector, in accordance with various aspects of the present disclosure. As shown, the electronic device 801 may include one or more processors 803, one or more network interfaces 804, one or more camera devices 808, one or more lighting devices 812, one or more input devices 814, one or more power sources 816, one or more speakers 818, one or more microphones 820, and memory 822. In various examples, the electronic device 801 may be a device comprising or integrating with an STA onboard system 202 such as electronic device 102A (e.g., a smart doorbell) or electronic device 102B (e.g., a security camera) shown and described in reference to FIG. 1.

As described herein, the STA onboard system 202 may include one or more (alone or in combination) different types of wakeup sensor(s) 204. For example, in some embodiments, the STA onboard system 202 may comprise PIR sensors, which may be secured on or within a PIR sensor holder that may reside behind a lens (e.g., a Fresnel lens). As previously described, the PIR sensors may detect IR radiation in an FOV (e.g., FOV 104A) and produce an output signal (typically a voltage) that changes as the amount of IR radiation in the FOV changes. The amount of voltage in the output signal may be compared, by the processor(s) 803, for example, to one or more threshold voltage values to determine if the amount of voltage in the output signal is indicative of motion, and/or if the amount of voltage in the output signal is indicative of motion of an object that is to be captured by the camera device(s) 808. In some examples, the processor(s) 803 may determine the distance based on the amount of voltage in the output signal. Additionally, or alternatively, in some examples, the processor(s) 803 may determine the distance based on which wakeup sensor detected the object.

Although the above discussion of the STA onboard system 202 primarily relates to PIR sensors, depending on the example, the STA onboard system 202 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type radio frequency wakeup sensor, the output signal may include doppler shift data from an ultrasonic-type wakeup sensor, the output signal may include radio wave disturbance from a tomographic-type wakeup sensor, and/or the output signal may include other data types for other sensor types that may be used as the STA onboard system 202. In at least some examples, the STA onboard system 202 may include wakeup sensor 204. In various examples, circuitry may be included in the electronic device 801 and/or in the image signal processor 846 that may be effective to perform the various motion detection techniques described herein. In various examples, a PIR sensor, accelerometer, radar sensor, or other wakeup sensor may be used to perform coarse motion detection. Once the PIR sensor or other wakeup sensor is triggered, other motion sensing techniques and/or CV-based object detection may be triggered.

A camera device 808 may be the same or similar to the camera device 206 illustrated in FIG. 2 and may include any device that includes an image sensor 844, such as a charge-coupled device (CCD) and/or an active-pixel sensor (CMOS sensor), that is capable of generating image data 826 (which may represent, and/or include, the frames of image data described herein), representing one or more images (e.g., a video). The camera device 808 may include a lens 838 that is effective to focus light on the image sensor 844. The light may be filtered by an RGB color filter array (CFA) 840 (e.g., a Bayer CFA) or an RGB-IR CFA. In one aspect of the present disclosure, the image sensor 844 may comprise a complementary metal-oxide semiconductor (CMOS) array and may be capable of recording high definition (e.g., 722p, 1800p, 4K, 8K) image and/or video files. The image sensor 844 may comprise a plurality of photosensors that may transform light into electrical signals. Such electrical signals may be represented by numerical values (e.g., floating point numbers) that may be processed using the image signal processor 846. Each photosensor of the image sensor 844 corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture.

In some other examples, the image sensor may be coated with a dual band-pass filter that has a passband at about 900 nm to allow IR color reproduction during the day and also to allow IR light detection when the camera device(s) 808 are in night mode. In some examples, the electronic device 801 may include an IR cut filter 842 to filter out infrared light from the light path of the photosensors when the electronic device 801 is configured in day mode. The IR cut filter 842 may be removed from the light path such that infrared light may reach the photosensors when the electronic device 801 is configured in night mode.

The camera device 808 may include a separate image signal processor 846, or the processor(s) 803 may perform the camera processing functionality. The processor(s) 803 (and/or camera processor) may include an encoding and compression chip. In some embodiments, the processor(s) 803 (and/or the camera processor) may comprise a bridge processor. The processor(s) 803 (and/or the camera processor) may process video recorded by the image sensor and may transform this data into a form suitable for transfer by the network interface(s) 804. In various examples, the camera device 808 also includes memory, such as volatile memory that may be used when data is being buffered or encoded by the processor(s) 803 (and/or the camera processor). For example, in certain embodiments the camera memory may comprise synchronous dynamic random-access memory (SD RAM).

The lighting device(s) 812 may be one or more light-emitting diodes capable of producing visible light and/or infrared light when supplied with power (e.g., to enable night vision). In some embodiments, when activated, the lighting device(s) 812 illuminates a light pipe. In some examples, the electronic device 801 uses the lighting device(s) 812 to illuminate specific components of the electronic device 801, such as the input device(s) 814. This way, users are able to easily see the components when proximate to the electronic device 801.

An input device 814 may include, but is not limited to, a button, a touch-sensitive surface, a switch, a slider, and/or any other type of device that allows a user to provide input to the electronic device 801. For example, if the electronic device 801 includes or is integrated with a doorbell, then the input device 814 may include a doorbell button. In some examples, based on receiving an input, the processor(s) 803 may receive a signal from the input device 814 and use the signal to determine that the input device 814 received the input. Additionally, the processor(s) 803 may generate input data representing the input received by the input device(s) 814. For example, the input data may represent the type of input (e.g., a push to a button), a time that the input occurred, and/or the like.

The power source(s) 816 may include one or more batteries that provide power to the electronic device 801. However, in other examples, the electronic device 801 may not include the power source(s) 816. In such examples, the electronic device 801 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

The speaker(s) 818 may be any electromechanical device capable of producing sound in response to an electrical signal input. The microphone(s) 820 may be an acoustic-to-electric transducer or sensor capable of converting sound waves into audio data 830 representing the sound. The speaker(s) 818 and/or microphone(s) 820 may be coupled to an audio CODEC to enable digital audio received by user devices to be decompressed and output by the speaker(s) 818 and/or to enable audio data captured by the microphone(s) 820 to be compressed into digital audio data 830. In some examples, the electronic device 801 includes the speaker(s) 818 and/or the microphone(s) 820 so that the user associated with the electronic device 801 can communicate with one or more other users located proximate to the electronic device 801. For example, the microphone(s) 820 may be used to generate audio data representing the speech of the one or more other users, which is then sent to the camera device. Additionally, the speaker(s) 818 may be configured to output user speech of the user, where the user's user speech may also be represented by audio data 830.

In some examples, the electronic device 801 determines that the start of the video is the first frame of the video. In some examples, such as when the electronic device 801 continuously generates the image data (e.g., the electronic device 801 does not turn off the camera device(s) 808), the start of the video corresponds to the portion of the video that the camera device(s) 808 were generating right after detecting an event (e.g., a motion event). For example, the start of the video may correspond to the first frame of the video after detecting the event. In other examples, such as when the electronic device 801 does not continuously generate the image data 826 (e.g., the electronic device 801 turns off the camera device(s) 808 until detecting an event such as a motion event), the start of the video corresponds to the first frame of the video that is generated by the camera device(s) 808.

As further illustrated in the example of FIG. 8, the electronic device 801 may include the computer-vision component 848. The computer-vision component 848 may be configured to analyze the image data 826 using one or more computer-vision techniques and output computer-vision data 850 based on the analysis. The computer-vision data 850 may represent information, such as the presence of an object represented by the image data 826, the type of object represented by the image data 826, locations of the object relative to the electronic device 801, a direction of movement of the object, a velocity of the object, and/or any other type of information. As described herein, the type of object may include, but is not limited to, a person, an animal (e.g., a dog, a cat, a bird, a squirrel), a car, a tree, a wall, and/or any other type of object. In some examples, the computer-vision data 850 may further represent a bounding box indicating the respective location of each object represented by the image data 826.

For example, the computer-vision component 848 may analyze the image data 826 using one or more computer-vision techniques such as, but not limited to, object detection technique(s), object tracking technique(s), semantic segmentation technique(s), instance segmentation technique(s), object co-segmentation techniques, and/or any other computer-vision technique(s). Computer-vision analysis includes methods for acquiring, processing, analyzing, and understanding digital images, such as by extracting high-dimensional data from the real world in order to produce numerical or symbolic information. This information is then used to identify object(s) represented in the image, locations of the object(s), a respective velocity of each object, and/or the like.

For a first example of performing computer-vision analysis, the computer-vision component 848 may use image segmentation technique(s) that use the computer-vision analysis to locate objects and boundaries (e.g., lines, curves) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video. In various examples, computer-vision component 848 may be used to evaluate cropped activity zones in which motion has been detected using the motion detection techniques described herein. In various examples, upon detecting an object of interest in the cropped activity zone, the electronic device may begin encoding and transmitting captured video to one or more remote devices.

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness, and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

For a second example of performing computer-vision analysis, the computer-vision component 848 may use object detection technique(s) that use computer-vision analysis to perform informative region selection, features extraction, and then classification of object(s) represented by the image data 826. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, and/or the like. Additionally, and/or alternatively, in some examples, the object detection technique(s) may include deep learning approaches, such as region proposal technique(s) (e.g., CNN technique(s)), you only look once technique(s), deformable convolutional networks technique(s), ad/or the like.

The electronic device 801 may also store command data 856. In some circumstances, a user of the electronic device 801 may want to receive a live view from the electronic device 801. The command data 856 may represent an identifier associated with the electronic device 801, a command to generate the image data 826, a command to send the image data 826, and/or the like. In some examples, the electronic device 801 may then analyze the command data 856 and, based on the identifier, determine that the command data 856 is directed to the electronic device 801. For example, the electronic device 801 may match the identifier represented by the command data 856 to an identifier associated with, and stored by, the electronic device 801. Additionally, the electronic device 801 may cause the camera device(s) 808 to begin generating the image data 826 (e.g., if the camera device(s) 808 are not already generating the image data 826) and send the image data 826 to the one or more computing devices implementing the STA onboard system 202, the camera device, and/or another device.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and/or the like. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information, and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enca OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

CONCLUSION

Among other potential benefits, a system in accordance with the present disclosure may conserve power consumption by reducing video capture, image capture, and/or streaming from wireless camera devices resulting from insignificant motion that is unlikely to be of interest to a user. For example, detection of motion by a wakeup sensor of a battery-powered camera device may be used to trigger video capture and/or streaming by the camera device. However, as described herein, wakeup sensors may be triggered by insignificant motion, such as ceiling fans, pets, wind blowing various objects, passing cars, etc. Accordingly, the battery of a battery-powered camera device may be drained at an increased rate due to capture of such insignificant events. Additionally, in some examples, unwanted notifications may be sent to a user of the camera system related to the insignificant motion events. Accordingly, as described herein, using a sensor threshold autocalibration approach whereby a sensor threshold value of a corresponding wakeup sensor may be dynamically updated to reduce false wakeups and/or reduce false positive object classifications and conserve power (e.g., batter power, mains power). Additionally, in some examples, detection of a potential motion event by a respective wakeup sensor may further trigger a computer-vision-based motion verification model to determine whether an object-of-interest is detected within an area-of-interest of a given environment in which motion was detected. The techniques described herein may result in significantly longer battery life of wireless electronic devices (e.g., smart doorbells, security cameras, and/or the like).

As set forth above, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state.

The example blocks or states may be performed in serial, in parallel or in some other manner. Blocks or states may be added to or removed from the disclosed example embodiments.

It will also be appreciated that various items may be stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another or may be combined in various ways. All possible combinations and sub-combinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements, and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A computer-implemented method comprising:

generating, during a sliding time window by a first wakeup sensor, first sensor data;

determining that the first sensor data represents a first potential motion event based on a comparison of the first sensor data with a first sensor threshold value;

in response to determining that the first sensor data satisfies the first sensor threshold value, controlling a first camera device to capture first video data comprising one or more video frames;

classifying, by an onboard motion verification model and based on the one or more video frames, the first potential motion event as one of a true positive motion event or a false positive motion event, wherein classifying the first potential motion event as a true positive motion event comprises determining that an object-of-interest is present within an area-of-interest of an environment indicated in the one or more video frames;

generating, by the onboard motion verification model, first motion verification data labeling the first potential motion event as a first true positive motion event;

determining a motion verification decision boundary, wherein the motion verification decision boundary is determined based on a first quantile of a first empirical distribution associated with a first set of false positive motion events that occurred during the sliding time window and a second quantile of a second empirical distribution associated with a first set of true positive motion events that occurred during the sliding time window, wherein the first set of true positive motion events comprises the first true positive motion event;

determining a first updated sensor threshold value by modifying the first sensor threshold value by a first amount, wherein the first amount is determined based on the motion verification decision boundary, and wherein the motion verification decision boundary is within an interval associated with the first quantile and the second quantile; and storing the first updated sensor threshold value in memory.

2. The computer-implemented method of claim 1, the computer-implemented method comprising:

determining that a value associated with the first quantile is below a predetermined threshold for a first predetermined amount of time, wherein determining the first updated sensor threshold value comprises decreasing the first sensor threshold value.

3. The computer-implemented method of claim 1, the computer-implemented method comprising:

determining that a value associated with the second quantile is below a predetermined threshold for a first predetermined amount of time, wherein determining the first updated sensor threshold value comprises increasing the first sensor threshold value.

4. A computer-implemented method comprising:

generating, by a first wakeup sensor of a device, first sensor data;

determining that the first sensor data represents a first potential motion event based on a comparison of the first sensor data with a first sensor threshold value;

in response to determining that the first sensor data represents the first potential motion event, controlling a first camera of the device to capture first video data;

generating, by a motion verification model on the device and based on the first video data, first motion verification data indicating that the first potential motion event is a first true positive motion event; and updating the first sensor threshold value based on the first motion verification data to generate a first updated sensor threshold value.

5. The computer-implemented method of claim 4, the computer-implemented method comprising:

determining a motion verification decision boundary, wherein the motion verification decision boundary is determined based on a first quantile of a first empirical distribution associated with a first set of false positive motion events that occurred during a sliding time window and a second quantile of a second empirical distribution associated with a first set of true positive motion events that occurred during the sliding time window, and wherein the first set of true positive motion events comprises the first true positive motion event.

6. The computer-implemented method of claim 5, the computer-implemented method comprising:

determining that a value associated with the first quantile is below a predetermined threshold for a first predetermined amount of time, wherein determining the first updated sensor threshold value comprises decreasing the first sensor threshold value.

7. The computer-implemented method of claim 5, the computer-implemented method comprising:

determining that a value associated with the second quantile is below a predetermined threshold for a first predetermined amount of time, wherein determining the first updated sensor threshold value comprises increasing the first sensor threshold value.

8. The computer-implemented method of claim 4, the computer-implemented method comprising:

determining that no false positive motion events and no true positive motion events have occurred for at least a first predetermined amount of time;

initiating a countdown timer associated with a second predetermined amount of time;

determining, based on an expiration of the countdown timer, that no false positive motion events and no true positive motion events have occurred within the second predetermined amount of time;

determining, based on a determination that no false positive motion events and no true positive motion events have occurred within the second predetermined amount of time, a second updated sensor threshold value by decreasing the first updated sensor threshold value by a second amount; and storing the second updated sensor threshold value in memory.

9. The computer-implemented method of claim 4, the computer-implemented method comprising:

generating, by the first wakeup sensor, second sensor data;

determining that the second sensor data represents a second potential motion event based on a comparison of the second sensor data with the first updated sensor threshold value;

in response to determining that the second sensor data satisfies the first updated sensor threshold value, controlling the first camera to capture second video data;

generating, by the motion verification model and based on the second video data, second motion verification data labeling the second potential motion event as a first false positive motion event, wherein labeling the second potential motion event as a first false positive motion event comprises determining that a nuisance object is present within an area-of-interest;

determining a second updated sensor threshold value by increasing the first updated sensor threshold value by a second amount, wherein the second updated sensor threshold value is used for a first predetermined amount of time associated with a higher-threshold period; and storing the second updated sensor threshold value in memory.

10. The computer-implemented method of claim 9, the computer-implemented method comprising:

determining the first predetermined amount of time has passed;

determining a third updated sensor threshold value by decreasing the second updated sensor threshold value by third amount; and storing the third updated sensor threshold value in memory.

11. The computer-implemented method of claim 4, wherein the first sensor threshold value corresponds to a first predetermined sensitivity level of the first wakeup sensor.

12. The computer-implemented method of claim 4, wherein the first wakeup sensor is a passive infrared (PIR) sensor, and wherein the first sensor data is a PIR signal magnitude data.

13. The computer-implemented method of claim 4, where the first wakeup sensor is an accelerometer, and wherein the first sensor data is a value indicating a change in velocity of an electronic device comprising the first wakeup sensor.

14. A system comprising:

a first wakeup sensor configured to generate first sensor data, wherein the first wakeup sensor is one of a passive infrared (PIR) sensor or an accelerometer;

at least one processor; and non-transitory computer readable memory storing instructions that, when executed by the at least one processor, are effective to:

determine that the first sensor data represents a first potential motion event based on a comparison of the first sensor data with a first sensor threshold value;

control, in response to determining that the first sensor data represents the first potential motion event, a first camera to capture first video data;

generate, by an onboard motion verification model and based on the first video data, first motion verification data labeling the first potential motion event as a first true positive motion event; and update the first sensor threshold value based on the first motion verification data to generate a first updated sensor threshold value.

15. The system of claim 14, wherein the instructions, when executed by the at least one processor, are effective to:

determine a motion verification decision boundary, wherein the motion verification decision boundary is determined based on a first quantile of a first empirical distribution associated with a first set of false positive motion events that occurred during a sliding time window and a second quantile of a second empirical distribution associated with a first set of true positive motion events that occurred during the sliding time window, and wherein the first set of true positive motion events comprises the first true positive motion event.

16. The system of claim 15, wherein the instructions, when executed by the at least one processor, are effective to:

determine that a value associated with the first quantile is below a predetermined threshold for a first predetermined amount of time, wherein the instructions effective to determine the first updated sensor threshold value comprise decreasing the first sensor threshold value.

17. The system of claim 15, wherein the instructions, when executed by the at least one processor, are effective to:

determining that a value associated with the second quantile is below a predetermined threshold for a first predetermined amount of time, wherein the instructions effective to determine the first updated sensor threshold value comprise increasing the first sensor threshold value.

18. The system of claim 14, wherein the instructions, when executed by the at least one processor, are effective to:

determine that no false positive motion events and no true positive motion events have occurred for at least a first predetermined amount of time;

initiate a countdown timer associated with a second predetermined amount of time;

determine, based on an expiration of the countdown timer, that no false positive motion events and no true positive motion events have occurred within the second predetermined amount of time;

determine, based on a determination that no false positive motion events and no true positive motion events have occurred within the second predetermined amount of time, determining a second updated sensor threshold value by decreasing the first updated sensor threshold value by a second amount; and store the second updated sensor threshold value in memory.

19. The system of claim 14, wherein the first wakeup sensor is configured to generate second sensor data, wherein the instructions, when executed by the at least one processor, are effective to:

determine that the second sensor data represents a second potential motion event based on a comparison of the second sensor data with the first updated sensor threshold value;

control, in response to determining that the second sensor data satisfies the first updated sensor threshold value, the first camera to capture second video data;

generate, by the onboard motion verification model and based on the second video data, second motion verification data labeling the second potential motion event as a first false positive motion event, wherein labeling the second potential motion event as a first false positive motion event comprises determining that a nuisance object is present within an area-of-interest;

determine a second updated sensor threshold value by increasing the first updated sensor threshold value by a second amount, wherein the second updated sensor threshold value is used for a first predetermined amount of time associated with a higher-threshold period; and store the second updated sensor threshold value in memory.

20. The system of claim 19, wherein the instructions, when executed by the at least one processor, are effective to:

determine the first predetermined amount of time has
   passed;
determine a third updated sensor threshold value by
   decreasing the second updated sensor threshold value
   by third amount; and
store the third updated sensor threshold value in memory.

\* \* \* \* \*